United States Patent
Kinoshita et al.

(10) Patent No.: US 11,603,920 B2
(45) Date of Patent: *Mar. 14, 2023

(54) CONTROL DEVICE FOR AUTOMATIC TRANSMISSION

(71) Applicant: Mazda Motor Corporation, Hiroshima (JP)

(72) Inventors: Tomokazu Kinoshita, Hiroshima (JP); Shotaro Hara, Hiroshima (JP); Shoji Abe, Hiroshima (JP); Toshiaki Shirasago, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 163 days.

This patent is subject to a terminal disclaimer.

(21) Appl. No.: 17/025,046

(22) Filed: Sep. 18, 2020

(65) Prior Publication Data

US 2021/0102620 A1 Apr. 8, 2021

(30) Foreign Application Priority Data

Oct. 4, 2019 (JP) .............................. JP2019-183705

(51) Int. Cl.
F16H 57/04 (2010.01)
F16H 59/72 (2006.01)

(52) U.S. Cl.
CPC ..... F16H 57/0473 (2013.01); F16H 57/0447 (2013.01); F16H 59/72 (2013.01); F16H 57/0442 (2013.01); F16H 2059/725 (2013.01)

(58) Field of Classification Search
CPC ............. F16H 57/0473; F16H 57/0447; F16H 57/0442; F16H 59/72; F16H 2059/725; F16H 59/42
See application file for complete search history.

(56) References Cited

U.S. PATENT DOCUMENTS 5,188,005 A 2/1993 Sankpal et al.
5,944,632 A 8/1999 Hara et al.
(Continued)

FOREIGN PATENT DOCUMENTS

EP 3217041 A1 * 9/2017 ............. F16D 13/74
JP 2004-324818 A 11/2004

Primary Examiner — Tisha D Lewis
(74) Attorney, Agent, or Firm — Alleman Hall Creasman & Tuttle LLP

(57) ABSTRACT

A control device for an automatic transmission is provided, which includes a vehicle-propelling friction engagement element configured to be engaged when a vehicle starts traveling, an other friction engagement element, a vehicle-propelling friction engagement element temperature detector configured to detect a temperature of the vehicle-propelling friction engagement element, an other friction engagement element temperature detector configured to detect a temperature of the other friction engagement element, and a processor configured to execute lubricant supply control logic to control supply of lubricant to the vehicle-propelling friction engagement element and the other friction engagement element. The lubricant supply control logic switches the supply amount of lubricant to the vehicle-propelling friction engagement element according to the temperature of the vehicle-propelling friction engagement element, and switches the supply amount of lubricant to the other friction engagement element according to the temperature of the other friction engagement element.

7 Claims, 11 Drawing Sheets

(56) References Cited

U.S. PATENT DOCUMENTS

| | | | |
|---|---|---|---|
| 6,594,573 | B1 | 7/2003 | Rossmann et al. |
| 8,997,958 | B2 * | 4/2015 | Schuller ............... F16H 61/688 |
| | | | 192/48.601 |
| 10,767,708 | B1 | 9/2020 | Logan et al. |
| 11,149,806 | B2 * | 10/2021 | Kinoshita ........... F16H 57/0441 |
| 2006/0054442 | A1 * | 3/2006 | Hegerath ............ F16H 61/0021 |
| | | | 192/48.9 |
| 2011/0166760 | A1 | 7/2011 | Kiessner-Haiden |
| 2014/0187382 | A1 | 7/2014 | Kang et al. |
| 2017/0241538 | A1 | 8/2017 | Tokozakura et al. |
| 2018/0003287 | A1 * | 1/2018 | Aoki .................. F16H 57/0413 |

* cited by examiner

|  | CL1 | CL2 | CL3 | BR1 | BR2 |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

FIG. 2

| Lubricant Supply Pattern | Pattern 1 Priority to Fuel Efficiency | | Pattern 2 Priority to Cooling of Each Clutch | | Pattern 3 Priority to Cooling of 2nd Brake | | Pattern 4 Cooling of Each Clutch and 2nd Brake | | Pattern 5 Maximum Priority to Cooling of 2nd Brake | |
|---|---|---|---|---|---|---|---|---|---|---|
| | BR2 | CL1 CL2 CL3 | BR2 | CL1 CL2 CL3 | BR2 | CL1 CL2 CL3 | BR2 | CL1 CL2 CL3 | BR2 | CL1 CL2 CL3 |
| Cooling level to each friction engagement element | L | L | L | H | H | L | H | H | HH | - |
| Communicating state of lubricant passage which communicates with each friction engagement element | f1 g c | f2 h | f1 g | f2 h | f1 g c | f2 h | f1 g c | f2 h | f1 g c | f2 h |
| | ○ × × | ○ × | ○ ○ × | × ○ | ○ ○ × | ○ × | ○ ○ × | ○ ○ | ○ ○ ○ | ○ × |
| Supply amount of lubricant to each friction engagement element | Given 1st Flow Rate (Small) | Given 2nd Flow Rate (Small) | Given 1st Flow Rate (Small) | Given 3rd Flow Rate (Large) | Given 4th Flow Rate (Large) | Given 2nd Flow Rate (Small) | Given 4th Flow Rate (Large) | Given 3rd Flow Rate (Large) | Given 5th Flow Rate (Extra Large) | Given 2nd Flow Rate (Small) |
| Assumed scene | -Low load -Low fuel efficiency mode -Coasting down | | -Acceleration -Scheduled up-shift -Torque demand gear-change -Initial state | | -High load -Slope climbing -Congested traffic | | -Acceleration -Scheduled up-shift -Torque demand gear-change | | -Towing -Hill hold mode | |

FIG. 8

CONTROL DEVICE FOR AUTOMATIC TRANSMISSION

TECHNICAL FIELD

The present disclosure relates to a control device for an automatic transmission mounted on a vehicle, such as an automobile, and particularly belongs to a technical field of a lubricating structure of a friction engagement element of the automatic transmission.

BACKGROUND OF THE DISCLOSURE

As it is well-known, an automatic transmission mounted on a vehicle has a plurality of friction engagement elements for switching a power transmitting path, and a hydraulic control device provided with a plurality of solenoid valves which control supplying and discharging of hydraulic fluid to and from the friction engagement elements. The automatic transmission is configured to realize a gear stage according to an operating state of the vehicle by controlling actuation of the solenoid valves by signals from the control device.

The friction engagement element of this kind of automatic transmission includes a friction engagement element for propelling the vehicle engaged when the vehicle starts traveling. Particularly in a transmission from which a torque converter is eliminated, it is necessary to gradually engage the vehicle-propelling friction engagement elements while slipping in order to smoothly start propulsion of the vehicle, via a so-called "half-clutch state," and during this engagement, friction plates generate heat by the sliding friction, and therefore, the durability may decline.

Thus, it is desirable to supply a larger amount of lubricant to the vehicle-propelling friction engagement element than other friction engagement elements depending on the operating state of the vehicle, and, for example, JP2004-324818A discloses an automatic transmission which changes a supplying amount of lubricant according to an engaged state of the vehicle-propelling friction engagement element when the vehicle travels. In detail, when the vehicle-propelling friction engagement element is in the engaged state, lubricant is supplied from a normal lubricant passage to the vehicle-propelling friction engagement elements, and when it is in a slipped state, the lubricant is supplied to the vehicle-propelling friction engagement elements from an additional lubricant passage, in addition to the normal lubricant passage.

According to the configuration of JP2004-324818A, in a condition where a thermal load is low, such as during a full engagement, a stirring resistance and a drag of the lubricant of the vehicle-propelling friction engagement element, and a discharge loss of an oil pump are reduced by limiting supply of the lubricant, and in a condition where thermal load is high, such as in a slipped state, the durability of the vehicle-propelling friction engagement elements is secured by fully supplying the lubricant and effectively cooling the vehicle-propelling friction engagement element.

Meanwhile, in recent automatic transmissions, a further reduction of the stirring resistance and the drag of the lubricant in the friction engagement elements, and the discharge loss of the oil pump, are demanded for an improvement in fuel efficiency.

However, the automatic transmission disclosed in JP2004-324818A does not take into consideration a supply amount of the lubricant to other friction engagement elements which cannot be in a condition where the thermal load is high, such as in a slip control, as compared with the vehicle-propelling friction engagement element.

In detail, to the other friction engagement elements, since the lubricant is supplied on the basis of a condition where the generated heat is the largest, when the generated heat is small, there is room for improvement in the stirring resistance and the drag of the lubricant of the friction engagement elements, and the discharge loss of the oil pump.

SUMMARY OF THE DISCLOSURE

One purpose of the present disclosure is to provide a control device for an automatic transmission, capable of controlling necessary supply of lubricant according to a traveling state of a vehicle to achieve both an improvement in fuel efficiency, and assurance of durability of vehicle-propelling friction engagement elements and other friction engagement elements of the transmission.

According to one aspect of the present disclosure, a control device for an automatic transmission is provided, which includes a vehicle-propelling friction engagement element configured to be engaged when a vehicle starts traveling, an other friction engagement element, a vehicle-propelling friction engagement element temperature detector configured to detect a temperature of the vehicle-propelling friction engagement element, an other friction engagement element temperature detector configured to detect a temperature of the other friction engagement element, and a processor configured to execute lubricant supply control logic to control supply of lubricant to the vehicle-propelling friction engagement element and the other friction engagement element. The lubricant supply control logic switches the supply amount of lubricant to the vehicle-propelling friction engagement element according to the temperature of the vehicle-propelling friction engagement element, and switches the supply amount of lubricant to the other friction engagement element according to the temperature of the other friction engagement element.

According to this configuration, since the supply amounts of lubricant to the vehicle-propelling friction engagement element and to the other friction engagement element can be switched according to the temperature of the vehicle-propelling friction engagement element and the temperature of the other friction engagement element, suitable amounts of lubricant can be supplied to the vehicle-propelling friction engagement element and to the other friction engagement element, according to the state of the vehicle.

Thus, while the priority is normally given to fuel efficiency and the amounts of lubricant to the vehicle-propelling friction engagement element and the other friction engagement element are reduced, the necessary amount of lubricant can be supplied to each of the vehicle-propelling friction engagement element and the other friction engagement element. As a result, in consideration of the state of the vehicle, both the improvement in fuel efficiency and assurance of durability of each friction engagement element can be achieved, for the whole transmission.

Particularly, as for the switching of the amount of lubricant to the vehicle-propelling friction engagement element which may be sensitive to a thermal load, by using the temperature of the vehicle-propelling friction engagement element which is the parameter most indicative of the thermal load, the supply amount of lubricant can be set appropriately.

As for the switching of the amount of lubricant to the other friction engagement element, by using the temperature of the other friction engagement element which is the parameter indicative of the thermal load, the supply amount of lubricant can be set appropriately.

Therefore, without complicating the control contents and the control conditions, both the improvement in fuel efficiency and the assurance of the durability of each friction engagement element can be achieved by supplying the amount of lubricant necessary for each friction engagement element of the automatic transmission according to the state of the vehicle.

The lubricant supply control logic may be provided with lubricant supply patterns for switching a supply destination of lubricant and a supply amount of lubricant to the supply destination. The lubricant supply patterns may include a first lubricant supply pattern in which the supply amount of lubricant to the vehicle-propelling friction engagement element is set as a given first flow rate, and the supply amount of lubricant to the other friction engagement element is set as a given second flow rate, a second lubricant supply pattern in which the supply amount of lubricant to the vehicle-propelling friction engagement element is set as the given first flow rate, and the supply amount of lubricant to the other friction engagement element is set as a given third flow rate greater than the given second flow rate, a third lubricant supply pattern in which the supply amount of lubricant to the vehicle-propelling friction engagement element is set as a given fourth flow rate greater than the given first flow rate, and the supply amount of lubricant to the other friction engagement element is set as the given second flow rate, and a fourth lubricant supply pattern in which the supply amount of lubricant to the vehicle-propelling friction engagement element is set as the given fourth flow rate, and the supply amount of lubricant to the other friction engagement element is set as the given third flow rate.

According to this configuration, the amounts of lubricant supplied to the vehicle-propelling friction engagement element and the other friction engagement element are made into the four patterns including the first to fourth lubricant supply patterns. Thus, it is not required to control the amounts of lubricant to the vehicle-propelling friction engagement element and the other friction engagement element independently, but only determining the lubricant supply patterns based on the parameters makes it possible to supply the suitable flow rates of lubricant to these elements as needed.

The lubricant supply control logic may switch the lubricant supply pattern to the second lubricant supply pattern, when the temperature of the vehicle-propelling friction engagement element is below the threshold and the temperature of the other friction engagement element is the threshold or above.

According to this configuration, even if the amount of lubricant to the other friction engagement element is increased, the amount of lubricant to the vehicle-propelling friction engagement element is not increased when the temperature of the vehicle-propelling friction engagement element is below the threshold, regardless of the amount of lubricant to the other friction engagement element. Thus, a stirring resistance and a drag of lubricant in the vehicle-propelling friction engagement element can surely be suppressed.

The lubricant supply control logic may switch the lubricant supply pattern to the fourth lubricant supply pattern, when the temperature of the vehicle-propelling friction engagement element is the threshold or above and the temperature of the other friction engagement element is the threshold or above.

According to this configuration, even if the amount of lubricant to the other friction engagement element is not increased, the flow rate of lubricant to the vehicle-propelling friction engagement element is increased when the temperature of the vehicle-propelling friction engagement element is the threshold or above, regardless of the flow rate of lubricant to the other friction engagement element. Thus, durability of the vehicle-propelling friction engagement element can surely be secured.

The lubricant supply control logic may be further provided with a fifth lubricant supply pattern in which the supply amount of lubricant to the vehicle-propelling friction engagement element is set as a given fifth flow rate greater than the given fourth flow rate, and the supply amount of lubricant to the other friction engagement element is set as the given second flow rate.

According to this configuration, the fifth lubricant supply pattern is provided in which the supply amount of lubricant to the vehicle-propelling friction engagement element is set as the given fifth flow rate more than the given fourth flow rate. Thus, in the state of the vehicle where the thermal load of the vehicle-propelling friction engagement element is more severe (e.g., an accelerator hill hold and towing), the durability of the vehicle-propelling friction engagement element can be certainly secured.

BRIEF DESCRIPTION OF DRAWINGS

FIG. 2 is an engagement table of the automatic transmission of FIG. 1.

FIG. 8 is a table illustrating lubricant supply patterns of the automatic transmission of the present disclosure.

DETAILED DESCRIPTION OF THE DISCLOSURE

Hereinafter, the details of an automatic transmission 10 according to one embodiment of the present disclosure are described.

Figure 1:
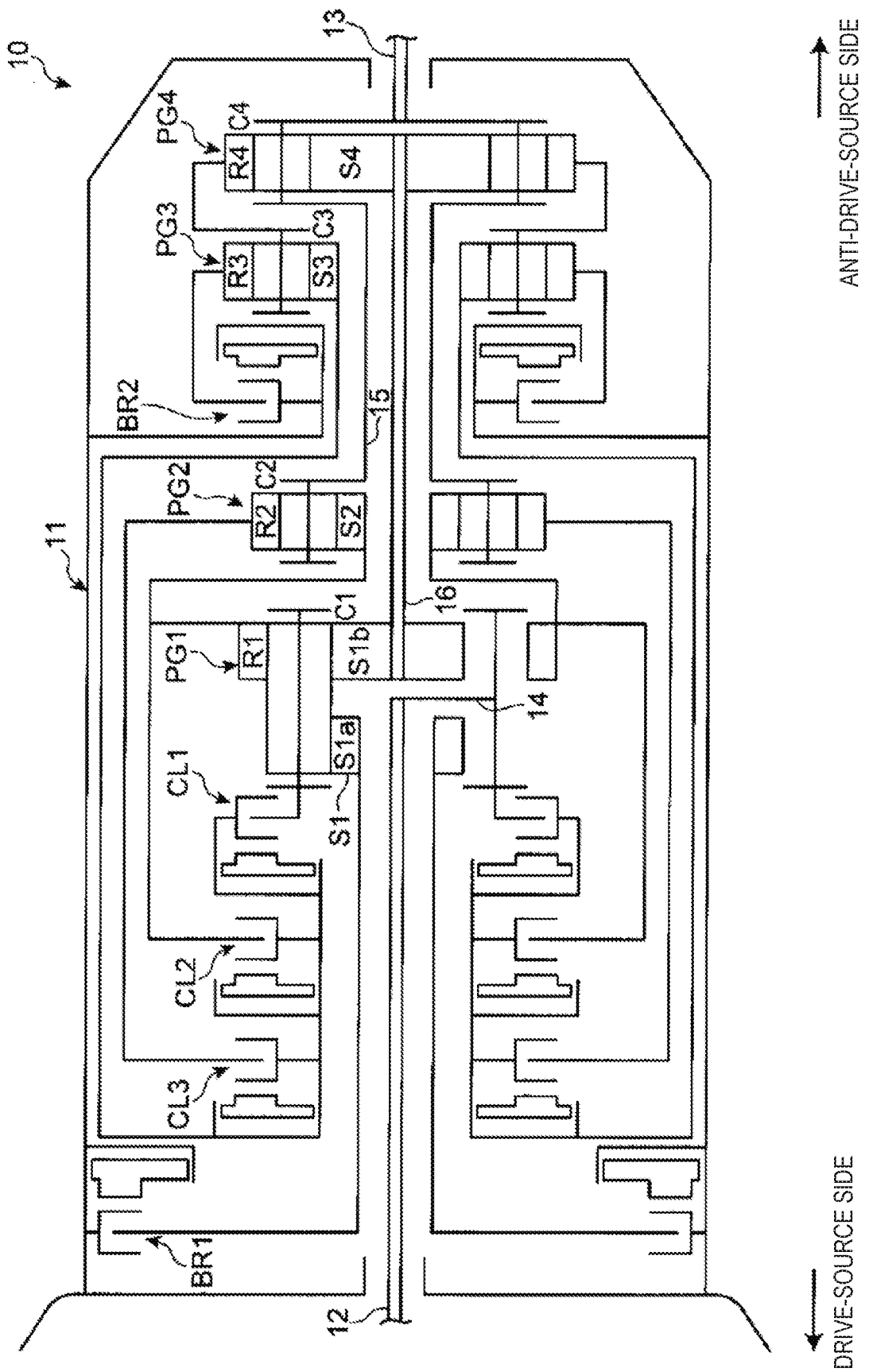
FIG. 1 is an outline view of an automatic transmission according to one embodiment of the present disclosure.

FIG. 1 is an outline view illustrating a configuration of the automatic transmission 10 according to this embodiment. This automatic transmission 10 is connected to a drive source, such as an engine, without having any hydraulic power transmission devices, such as a torque converter, therebetween. The automatic transmission 10 has, inside a transmission casing 11, an input shaft 12 which is connected to the drive source and disposed at the drive-source side (the left side of this drawing), and an output shaft 13 disposed at the opposite side (anti-drive-source side: the right side of this drawing). The automatic transmission 10 is a longitudinal type for a Front-engine Rear-drive (FR) vehicle in which the input shaft 12 and the output shaft 13 are disposed coaxially.

On the axial center of the input shaft 12 and the output shaft 13, from the drive-source side, first, second, third, and fourth planetary gear sets (hereinafter, simply referred to as "the first, second, third, and fourth gear sets") PG1, PG2, PG3, and PG4 are disposed.

Inside the transmission casing 11, a first clutch CL1 is disposed at the drive-source side of the first gear set PG1, a second clutch CL2 is disposed at the drive-source side of the first clutch CL1, and a third clutch CL3 is disposed at the drive-source side of the second clutch CL2. Moreover, a first brake BR1 is disposed at the drive-source side of the third clutch CL3, and a second brake BR2 is disposed at the drive-source side of the third gear set PG3 and at the anti-drive-source side of the second gear set PG2.

Each of the first, second, third, and fourth gear sets PG1, PG2, PG3, and PG4 is of a single pinion type in which a pinion supported by a carrier directly meshes with a sun gear and a ring gear. The first, second, third, and fourth gear sets PG1, PG2, PG3, and PG4 have, as rotating elements, sun gears S1, S2, S3, and S4, ring gears R1, R2, R3 and R4, and carriers C1, C2, C3 and C4.

The first gear set PG1 is of a double sun gear type in which the sun gear S1 is divided into two in the axial direction. The sun gear S1 has a first sun gear S1$a$ disposed at the drive-source side in the axial direction, and a second sun gear S1$b$ disposed at the anti-drive-source side. The first and second sun gears S1$a$ and S1$b$ have the same number of teeth, and mesh with the same pinion supported by the carrier C1. Therefore, the first and second sun gears S1$a$ and S1$b$ always rotate in the same manner.

In the automatic transmission 10, the sun gear S1 of the first gear set PG1 (concretely, the second sun gear S1$b$) and the sun gear S4 of the fourth gear set PG4 are always coupled to each other, the ring gear R1 of the first gear set PG1 and the sun gear S2 of the second gear set PG2 are always coupled to each other, the carrier C2 of the second gear set PG2 and the carrier C4 of the fourth gear set PG4 are always coupled to each other, and the carrier C3 of the third gear set PG3 and the ring gear R4 of the fourth gear set PG4 are always coupled to each other.

The input shaft 12 is always coupled to the carrier C1 of the first gear set PG1 through between the first sun gear S1$a$ and the second sun gear S1$b$, and the output shaft 13 is always coupled to the carrier C4 of the fourth gear set PG4. In detail, the input shaft 12 is coupled to the first carrier C1 through a power transmission member 14 passing through between the pair of first and second sun gears S1$a$ and S1$b$, and the fourth carrier C4 and the second carrier C2 are coupled to each other through a power transmission member 15.

The first clutch CL1 is disposed between the input shaft 12 and the carrier C1 of the first gear set PG1, and the sun gear S3 of the third gear set PG3, to engage and disengage therebetween. The second clutch CL2 is disposed between the ring gear R1 of the first gear set PG1 and the sun gear S2 of the second gear set PG2, and the sun gear S3 of the third gear set PG3, to engage and disengage therebetween.

The third clutch CL3 is disposed between the ring gear R2 of the second gear set PG2 and the sun gear S3 of the third gear set PG3, to engage and disengage therebetween.

The first brake BR1 is disposed between the transmission casing 11 and the sun gear S1 of the first gear set PG1 (concretely, the first sun gear S1$a$), to engage and disengage therebetween. The second brake BR2 is disposed between the transmission casing 11 and the ring gear R3 of the third gear set PG3, to engage and disengage therebetween.

By the above structure, as illustrated in FIG. 2, the automatic transmission 10 forms first to eighth gears in a D-range (Drive range) and a reverse gear in an R range (Reverse range) by combining the engaged states of the first clutch CL1, the second clutch CL2, the third clutch CL3, the first brake BR1, and the second brake BR2.

The structures of the first and second brakes BR1 and BR2, and the first to third clutches CL1, CL2, and CL3 are described with reference to FIGS. 3 and 4.

Figure 3:
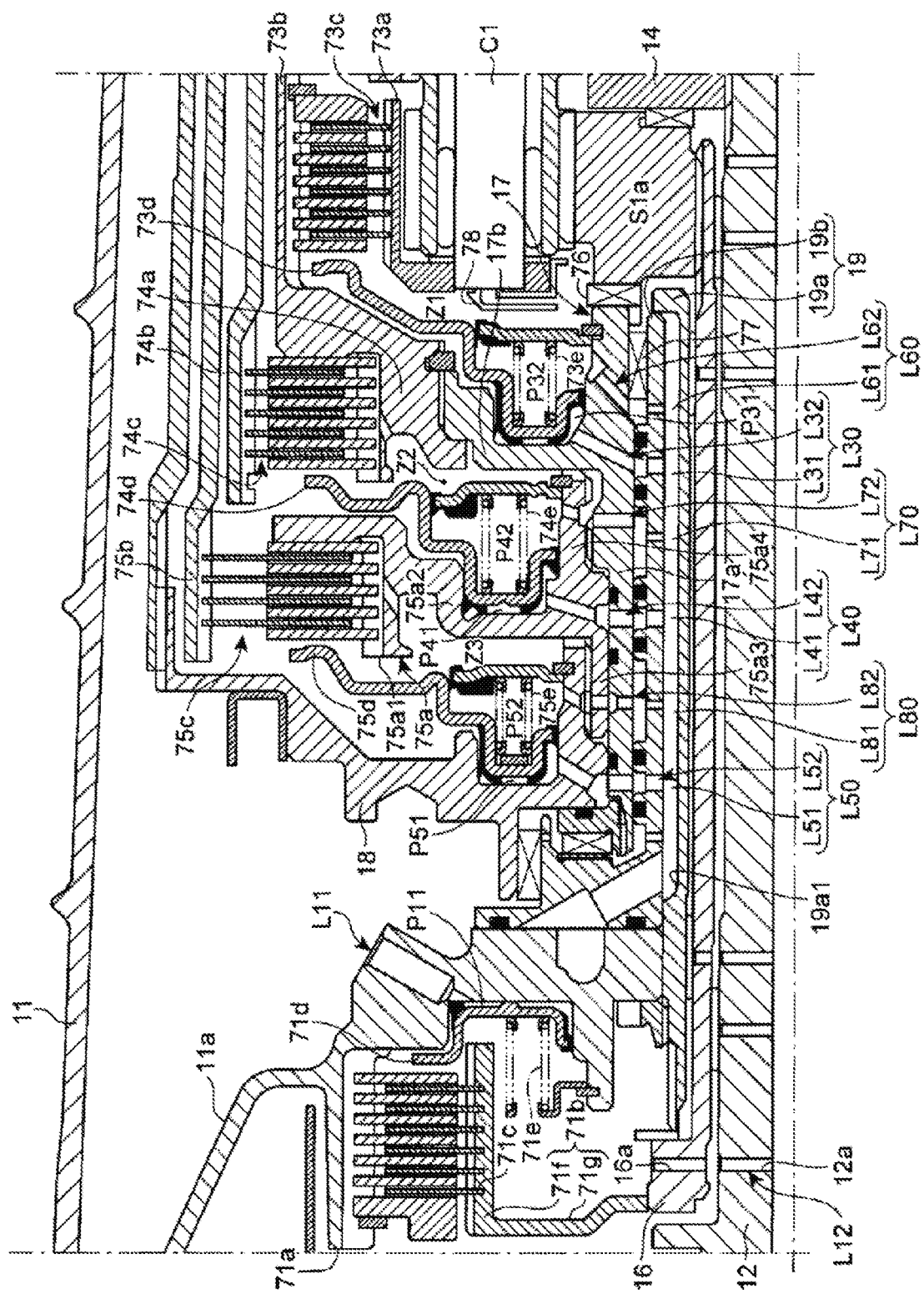
FIG. 3 is a cross-sectional view of a first brake part and first to third clutch parts in the automatic transmission of the present disclosure.

As illustrated in FIG. 3, the first brake BR1 has a drum member 71$a$ provided integrally with a vertical wall part 11$a$ extending inwardly in the radial direction from the transmission casing 11, a hub member 71$b$ provided radially inward of the drum member 71$a$, a plurality of friction plates 71$c$ disposed with spacing therebetween in the axial direction, between the hub member 71$b$ and the drum member 71$a$, and a piston 71$d$ disposed at the anti-drive-source side of the plurality of friction plates 71$c$ to engage the plurality of friction plates 71$c$.

The first brake BR1 is provided radially inward of the hub member 71$b$ with a return spring 71$e$ for biasing the piston 71$d$ to the anti-drive-source side.

Between the piston 71$d$ and the vertical wall part 11$a$, an engagement hydraulic chamber (hereinafter, may also be referred to as "the engagement chamber") P11 to which hydraulic fluid for biasing the piston 71$d$ in the engagement direction is supplied is formed. An engagement supply oil passage L11 (hereinafter, referred to as "the engagement oil passage") for supplying the hydraulic fluid to the engagement chamber P11 of the first brake BR1 is provided to the vertical wall part 11$a$. When the hydraulic fluid is supplied to the engagement chamber P11 from a valve body (not illustrated) through the engagement oil passage L11, the plurality of friction plates 71$c$ are engaged, and the hub member 71$b$ of the first brake BR1 is coupled to the transmission casing 11.

The hub member 71$b$ of the first brake BR1 includes a cylindrical part 71$f$ outward in the radial direction, and a vertical wall part 71$g$ extending inwardly in the radial direction from an end part of the cylindrical body on the drive-source side. The hub member 71$b$ of the first brake BR1 is connected with the sun gear S1$a$ through a power transmission member 16 in an end part radially inward of the vertical wall part 71$g$. The input shaft 12 is disposed radially inward of the power transmission member 16.

A lubricant passage L12 for supplying lubricant to the first brake BR1 is provided to the power transmission member 16 and the input shaft 12. The lubricant passage L12 has an axial oil passage provided inside the input shaft 12 which communicates with the valve body, and radial oil passages 12$a$ and 16$a$ provided to the input shaft 12 and the power transmission member 16, respectively. Lubricant supplied from the valve body is supplied to the first brake BR1 through the lubricant passage L12.

Figure 4:
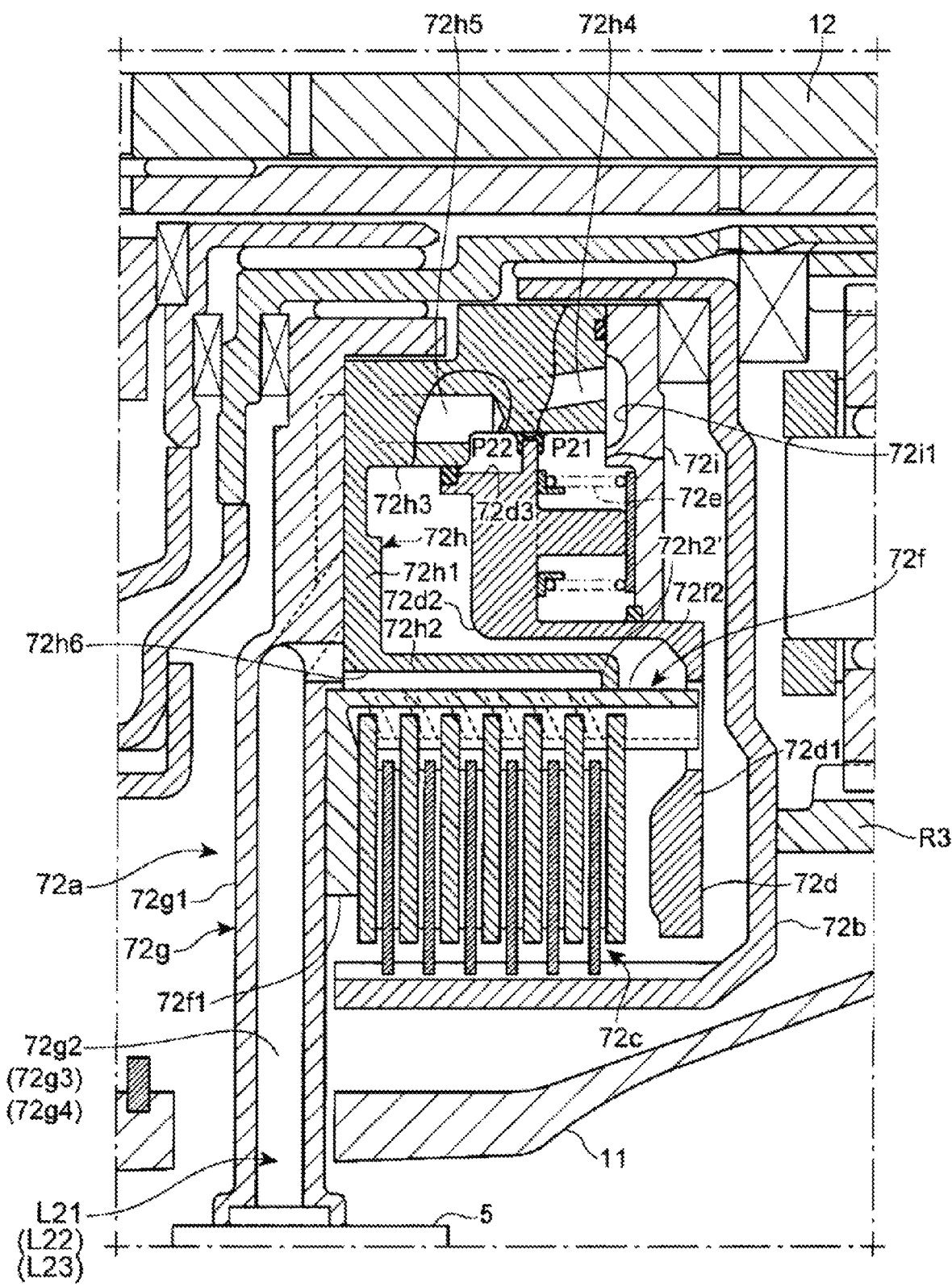
FIG. 4 is a cross-sectional view of a second brake part in the automatic transmission of the present disclosure.

As illustrated in FIG. 4, the second brake BR2 has a hub member 72$a$ coupled to the transmission casing 11, a drum member 72$b$ which is disposed at the anti-drive-source side of the hub member 72$a$ and is coupled to the ring gear R3 of the third gear set PG3, a plurality of friction plates 72c disposed with spacing therebeween in the axial direction and disposed between the hub member 72a and the drum member 72b, and a piston 72d which is disposed at the anti-drive-source side of the plurality of friction plates 72c and engages the plurality of friction plates 72c.

The second brake BR2 has, radially inward of the friction plates 72c, hydraulic chambers P21 and P22 to which hydraulic fluid for biasing the piston 72d is supplied. The hydraulic chambers P21 and P22 are comprised of an engagement chamber P21 to which engagement hydraulic fluid for biasing the piston 72d in the engagement direction is supplied, and a disengagement chamber P22 to which disengagement hydraulic fluid for biasing the piston 72d in the disengagement direction is supplied.

The second brake BR2 is also provided radially inward of the friction plates 72c with a spring 72e which applies a biasing force in the engagement direction to the piston 72d.

The hub member 72a of the second brake BR2 includes a first hub member 72f with which the friction plates 72c are spline-engaged and which is spline-engaged with the transmission casing 11, a second hub member 72g which is disposed at the drive-source side of the first hub member 72f and is fitted into the transmission casing 11, and which extends inwardly in the radial direction of the first hub member 72f, a third hub member 72h coupled to the anti-drive-source side of the second hub member 72g, inwardly in the radial direction of the first hub member 72f, and a fourth hub member 72i coupled to the anti-drive-source side of the third hub member 72h, inwardly in the radial direction of the first hub member 72f.

The first hub member 72f includes a vertical wall part 72f1 which extends in a direction perpendicular to the axial direction of the transmission casing 11 and is formed in a substantially disk shape, and a cylindrical part 72f2 which extends in a substantially cylindrical shape, inward in the radial direction of the vertical wall part 72f1, from the vertical wall part 72f1 to the anti-drive-source side.

The first hub member 72f is coupled to the transmission casing 11 by a spline part (not illustrated) formed in an outer circumferential surface of the vertical wall part 72f1 being spline-engaged with a spline part (not illustrated) of the transmission casing 11. The friction plates 72c are spline-engaged with a spline part provided in the outer circumferential surface of the cylindrical body 72f2 of the first hub member 72f.

The second hub member 72g is provided with a vertical wall part 72g1 which extends in a direction perpendicular to the axial direction of the transmission casing 11 and is formed in a substantially disk shape. In the vertical wall part 72g1 of the second hub member 72g, an engagement oil passage L21 which supplies the engagement hydraulic fluid to the engagement chamber P21 (described below), a disengagement oil passage L22 which supplies the disengagement hydraulic fluid to the disengagement chamber P22, and a lubricant passage L23 which supplies lubricating hydraulic fluid to the friction plates 72c are formed.

The engagement oil passage L21, the disengagement oil passage L22, and the lubricant passage L23 are disposed so as to be lined up in the circumferential direction below the transmission casing 11, and the second hub member 72g is formed so that the engagement oil passage L21, the disengagement oil passage L22, and the lubricant passage L23 are each connected to a valve body 5.

The third hub member 72h includes a vertical wall part 72h1 which extends in a direction perpendicular to the axial direction of the transmission casing 11 and is formed in a substantially disk shape, a first cylindrical body 72h2 which extends in a substantially cylindrical shape from radially outward of the vertical wall part 72h1 to the anti-drive-source side, and a second cylindrical body 72h3 which extends in a substantially cylindrical shape from radially inward of the vertical wall part 72h1 to the anti-drive-source side.

The first cylindrical body 72h2 of the third hub member 72h is provided inward in the radial direction of the cylindrical body 72f2 of the first hub member 72f. The first cylindrical body 72h2 of the third hub member 72h is provided with a flange part 72h2' extending outwardly in the radial direction so that it contacts at the anti-drive-source side the inner circumferential surface of the cylindrical body 72f2 of the first hub member 72f, and is provided so as to form the engagement oil passage L21 between the cylindrical body 72f2 of the first hub member 72f. The hydraulic chambers P21 and P22 are formed in the outer circumferential surface of the second cylindrical body 72h3 of the third hub member 72h.

The fourth hub member 72i is formed in a substantially disk shape extending in a direction perpendicular to the axial direction of the transmission casing 11, and is disposed at the anti-drive-source side of the third hub member 72h. The fourth hub member 72i is formed so as to extend outwardly in the radial direction of the second cylindrical body 72h3 of the third hub member 72h, and an outer circumferential surface of the fourth hub member 72i is fitted into the piston 72d.

The piston 72d is disposed between the cylindrical body 72f2 of the first hub member 72f and the drum member 72b, and is slidably fitted onto the outer circumferential surface of the second cylindrical body 72h3 of the third hub member 72h. The piston 72d is formed annularly, and is provided with a pressing part 72d1 which is provided at the outer circumferential side and presses the friction plates 72c, and a hydraulic chamber forming part 72d2 which is provided at the inner circumferential side and forms the hydraulic chambers P21 and P22.

The hydraulic chamber forming part 72d2 extends inwardly in the radial direction from the anti-drive-source side of the friction plates 72c, is fitted onto an outer circumferential surface of the fourth hub member 72i, and is fitted onto the outer circumferential surface of the second cylindrical body 72h3 of the third hub member 72h. Therefore, the engagement chamber P21 is formed by a surface of the hydraulic chamber forming part 72d2 on the anti-drive-source side, an outer circumferential surface of the third hub member 72h, and a surface of the fourth hub member 72i on the drive-source side. A notch 72d3 is formed in a radially-inward end part of the hydraulic chamber forming part 72d2, and the disengagement chamber P22 is formed between the second cylindrical body 72h3 and the notch 72d3.

The engagement oil passage L21 has a radial oil passage 72g2 provided to the second hub member 72g, an axial oil passage 72h4 provided to the third hub member 72h, and a groove 72i1 formed in the fourth hub member 72i. Hydraulic fluid supplied from the valve body 5 is supplied to the engagement chamber P21 through the engagement oil passage L21.

The disengagement oil passage L22 has a radial oil passage 72g3 provided to the second hub member 72g, and an axial oil passage 72h5 provided to the third hub member 72h. Hydraulic fluid supplied from the valve body 5 is supplied to the engagement chamber P22 through the engagement oil passage L22.

The lubricant passage L23 has a radial oil passage 72g4 provided to the second hub member 72g, and a circumferential oil passage 72h6 formed between an outer circumferential surface of the first cylindrical body 72h2 of the third hub member 72h and an inner circumferential surface of the cylindrical body 72f2 of the first hub member 72f. Lubricant supplied from the valve body 5 is supplied to the friction plates 72c through the lubricant passage L23.

As illustrated in FIG. 3, the first to third clutches CL1, CL2, and CL3 have hub members 73a, 74a, and 75a, drum members 73b, 74b, and 75b, a plurality of friction plates 73c, 74c, and 75c lined up in the axial direction between the hub members 73a, 74a, and 75a and the drum members 73b, 74b, and 75b, and pistons 73d, 74d, and 75d which are disposed at the anti-drive-source side of the plurality of friction plates 73c, 74c, and 75c and engage the plurality of friction plates 73c, 74c, and 75c, respectively.

Inward in the radial direction of the plurality of friction plates 73c, 74c, and 75c, engagement chambers P31, P41, and P51 and balance chambers P32, P42, and P52 are provided, respectively. Inside the balance chambers P32, P42, and P52, return springs 73e, 74e, and 75e which bias the pistons 73d, 74d, and 75d to the disengagement side are disposed, respectively.

In inner circumferential side of the hub member 74a of the second clutch CL2 and the hub member 75a of the third clutch CL3, a power transmission member 17 which couples the hub member 74a of the second clutch CL2 to the hub member 75a of the third clutch CL3 is provided.

The power transmission member 17 has a cylindrical body 17a extending in the axial direction inwardly in the radial direction, and a vertical wall part 17b extending outwardly in the radial direction in an intermediate part of the cylindrical body 17a in the axial direction from a location according to the hub member 74a of the second clutch CL2. A spline part which fits into a spline part formed in an inner circumferential surface of the hub member 74a of the second clutch CL2 is formed in an outer circumferential surface of the vertical wall part 17b.

In an end part of the cylindrical body 17a on the anti-drive-source side, a thrust bearing 76 which permits a relative rotation of the first gear set PG1 to the sun gear S1 is disposed. In a part of an outer circumferential surface of the cylindrical body 17a on the drive-source side of the vertical wall part 17b, a spline part which fits into a spline part formed in an inner circumferential surface of the hub member 75a of the third clutch CL3 (described below) is formed.

The hub member 75a of the third clutch CL3 has a cylindrical spline part 75a1 which engages at an outer circumferential surface thereof with the plurality of friction plates 75c, a vertical wall part 75a2 extending inwardly in the radial direction from the spline part 75a1, and a first cylindrical body 75a3 on the drive-source side and a second cylindrical body 75a4 on the anti-drive-source side, extending in the axial direction from a radially-inward end part of the vertical wall part 75a2.

A spline part is formed in an outer circumferential surface of the first cylindrical body 75a3 and an inner circumferential surface of the second cylindrical body 75a4. A power transmission member 18 for transmitting power to the sun gear S3 of the third gear set PG3 is spline-fitted into the spline part of the first cylindrical body 75a3. The spline part of the second cylindrical body 75a4 is spline-fitted onto the spline part in an outer circumferential surface of the power transmission member 17.

Therefore, the drum member 73b of the first clutch CL1, the hub member 74a of the second clutch CL2, the hub member 75a of the third clutch CL3, and the sun gear S3 of the third gear set PG3 rotate integrally.

A sleeve member 19 integrally formed with the vertical wall part 11a is disposed at the inner circumferential side of the power transmission member 17. The power transmission member 17 is rotatably supported by the sleeve member 19 through a bearing 77 provided in a part of an inner circumference of the cylindrical body 17a on the anti-drive-source side of the vertical wall part 17b. The sleeve member 19 is comprised of a first sleeve member 19a extending in the axial direction, and a second sleeve member 19b press-fitted outward of the first sleeve member 19a in the radial direction.

The sleeve member 19 is provided with engagement oil passages L30, L40, and L50, and balance chamber oil passages L60, L70, and L80 for supplying hydraulic fluid to the engagement chambers P31, P41, and P51 and the balance chambers P32, P42, and P52 of the first to third clutches CL1, CL2, and CL3, respectively.

The engagement oil passages L30, L40, and L50 of the first to third clutches CL1, CL2, and CL3 have engagement chamber axial oil passages L31, L41, and L51 which communicate with a control valve (not illustrated), and engagement radial oil passages L32, L42, and L52 which communicate the engagement chamber axial oil passages L31, L41, and L51 with the engagement chambers P31, P41, and P51.

The engagement chamber axial oil passages L31, L41, and L51 are fixed to the transmission casing 11, and are formed between the first sleeve member 19a provided with a plurality of grooves 19a1 which extend in the axial direction, are formed in different locations in the circumferential direction, and open outwardly in the radial direction, and the second sleeve member 19b which is press-fitted outward of the first sleeve member 19a in the radial direction.

The engagement radial oil passage L32 of the first clutch CL1 is formed by a radial oil passage which penetrates the second sleeve member 19b in the radial direction, and a radial oil passage which penetrates the power transmission member 17 in the radial direction so as to communicate this radial oil passage with the engagement hydraulic chamber P31. Therefore, the engagement hydraulic fluid of the first clutch CL1 is supplied to the engagement chamber P31 of the first clutch CL1 through the engagement oil passage L30.

The engagement radial oil passage L42 of the second clutch CL2 is formed by a radial oil passage which penetrates the second sleeve member 19b in the radial direction, a radial oil passage which penetrates the power transmission member 17 in the radial direction, and a radial oil passage which penetrates the second cylindrical body 75a4 of the hub member 75a of the third clutch CL3 in the radial direction so as to communicate these radial oil passages with the engagement chamber P41. Therefore, the engagement hydraulic fluid of the second clutch CL2 is supplied to the engagement chamber P41 of the second clutch CL2 through the engagement oil passage L40.

The engagement radial oil passage L52 of the third clutch CL3 is formed by a radial oil passage which penetrates the second sleeve member 19b in the radial direction, a radial oil passage which penetrates the power transmission member 17 in the radial direction, and a radial oil passage which penetrates the power transmission member 18 in the radial direction so as to communicate these radial oil passages with the engagement chamber P51. Therefore, the engagement hydraulic fluid of the third clutch CL3 is supplied to the engagement chamber P51 of the third clutch CL3 through the engagement oil passage L50.

The balance chamber oil passages L60, L70, and L80 include, similar to the engagement oil passages L30, L40, and L50, centrifugal balance chamber axial oil passages L61, L71, and L81 which communicate with a control valve (not illustrated) provided to the transmission casing 11, and centrifugal balance chamber radial oil passages L62, L72 and L82 which communicate with the centrifugal balance chamber axial oil passages L61, L71, and L81.

The centrifugal balance chamber axial oil passages L61, L71, and L81 of the first to third clutches CL1-CL3 are formed at different locations in the circumferential direction from the locations of the engagement chamber axial oil passages L31, L41, and L51 of the sleeve member 19.

The balance chamber radial oil passage L62 of the first clutch CL1 is formed by a radial oil passage which penetrates the second sleeve member 19b in the radial direction, and a radial oil passage which penetrates the power transmission member 17 in the radial direction so as to communicate this radial oil passage with the balance chamber P32. Therefore, balance chamber hydraulic fluid of the first clutch CL1 is supplied to the balance chamber P32 of the first clutch CL1 through the balance chamber oil passage L60.

The balance chamber radial oil passage L72 of the second clutch CL2 is formed by a radial oil passage which penetrates the second sleeve member 19b in the radial direction, a radial oil passage which penetrates the power transmission member 17 in the radial direction, and a radial oil passage which penetrates the second cylindrical body 75a4 of the hub member 75a of the third clutch CL3 in the radial direction so as to communicate these engagement radial oil passages with the balance chamber P42. Therefore, the engagement hydraulic fluid of the second clutch CL2 is supplied to the balance chamber P42 of the second clutch CL2 through the balance chamber oil passage L70.

The balance chamber radial oil passage L82 of the third clutch CL3 is formed by a radial oil passage which penetrates the second sleeve member 19b in the radial direction, a radial oil passage which penetrates the power transmission member 17 in the radial direction, and a radial oil passage which penetrates the power transmission member 18 in the radial direction so as to communicate these radial oil passages with the balance chamber P52. Therefore, the balance chamber hydraulic fluid of the third clutch CL3 is supplied to the balance chamber P52 of the third clutch CL3 through the balance chamber oil passage L80.

Note that in this embodiment, the balance chamber axial oil passages L61, L71, and L81 of the first to third clutches CL1, CL2, and CL3 are formed by the same groove formed in the sleeve member 19. Therefore, the hydraulic fluid is simultaneously supplied to the balance chambers of the first to third clutches CL1, CL2, and CL3.

Next, supply routes of the lubricant for lubricating the plurality of friction plates 73c, 74c, and 75c of the first to third clutches CL1, CL2, and CL3 are described.

The supply route of the lubricant supplied to the friction plates 73c of the first clutch CL1 is formed so as to communicate a space Z1 between the centrifugal balance chamber P32 of the first clutch CL1 and the first gear set PG1 with the balance chamber axial oil passage L61 of the first clutch CL1, and the radial oil passage formed in the second sleeve member 19b, through a bearing 77 and the thrust bearing 76.

The lubricant which flowed into the space Z1 is rectified by a baffle plate 78 provided between the first gear set PG1 and the balance chambers P32 of the first clutch CL1, and is supplied to the friction plates 73c of the first clutch CL1 and the bearing of the carrier C1 of the first gear set PG1.

The supply route of the lubricant supplied to the friction plates 74c of the second clutch CL2 is formed so as to communicate a space Z2 between the centrifugal balance chamber P42 of the second clutch CL2 and the hub member 74a of the second clutch CL2, with the balance chamber axial oil passage L71 of the second clutch CL2, and the radial oil passage formed in the second sleeve member 19b, through the notch formed in an end part of the second cylindrical body 75a4 of the hub member 75a on the anti-drive-source side. Therefore, the lubricant which flowed into the space Z2 is supplied to the friction plates 74c.

The supply route of the lubricant supplied to the friction plates 75c of the third clutch CL3 is formed so as to communicate a space Z3 between the centrifugal balance chamber P52 of the third clutch CL3 and the vertical wall part 75a2 of the hub member 75a of the third clutch CL3, with the balance chamber axial oil passage L81 of the third clutch CL3, the radial oil passage formed in the second sleeve member 19b, and a spline fitting part between the hub member 75a of the third clutch CL3 and the power transmission member 18, through the notch formed in a radially-inward end part of the power transmission member 18 on the anti-drive source side. Therefore, the lubricant which flowed into the space Z3 is supplied to the friction plates 75c.

As described above, in this embodiment, the balance chamber axial oil passages L61, L71, and L81 of the first to third clutches CL1, CL2, and CL3 are formed by the same groove formed in the sleeve member 19. Therefore, the lubricant is simultaneously supplied to the friction plates 73c, 74c, and 75c of the first to third clutches CL1, CL2, and CL3.

The automatic transmission 10 has a hydraulic control device 2 for realizing the gear stage by engaging and disengaging the above-described friction engagement elements BR1, BR2, CL1, CL2, and CL3, and this hydraulic control device 2 is described in detail.

Figure 5:
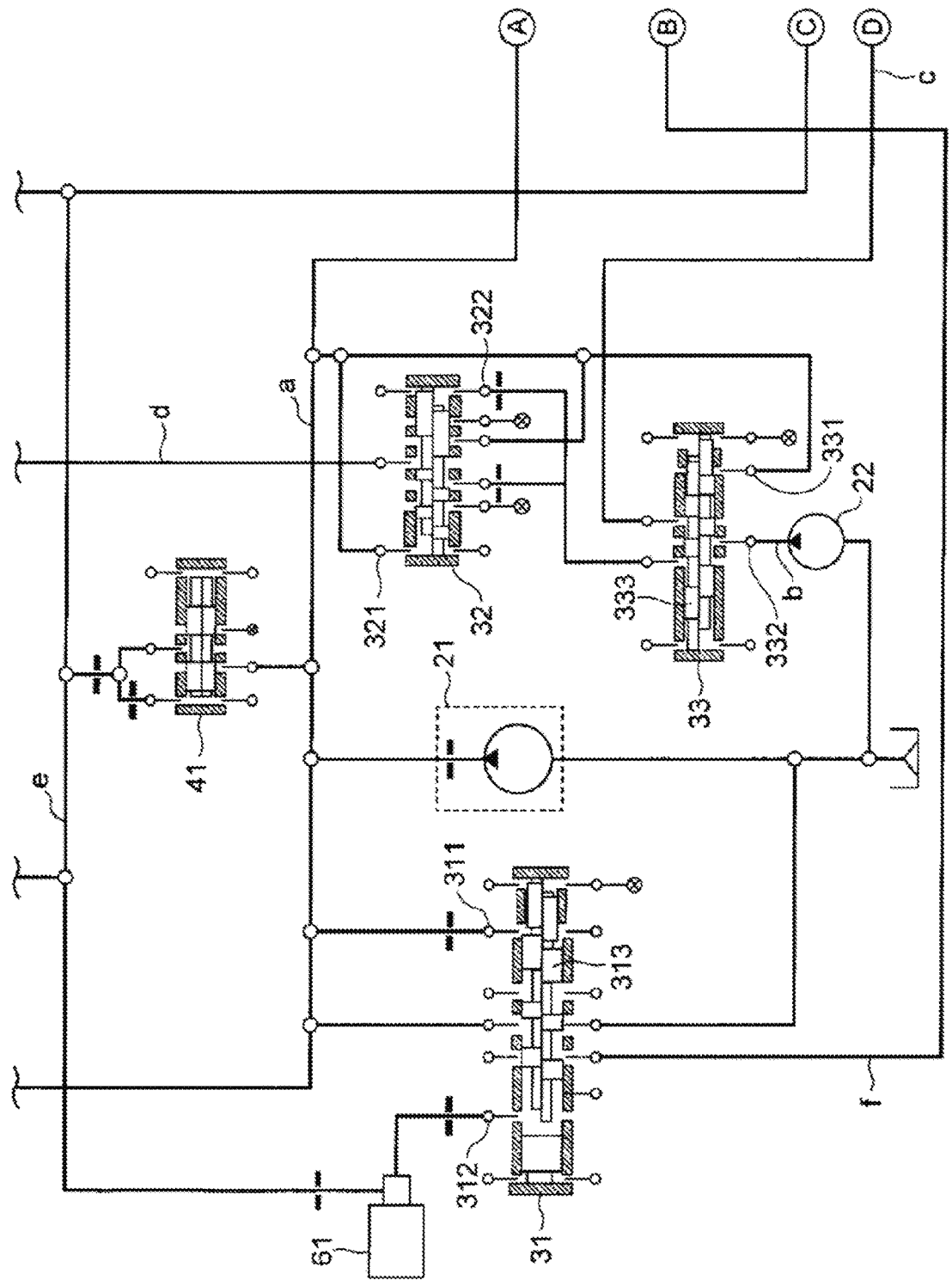
FIG. 5 is a circuit diagram illustrating a part of a hydraulic circuitry of the automatic transmission of the present disclosure.
Figure 6:
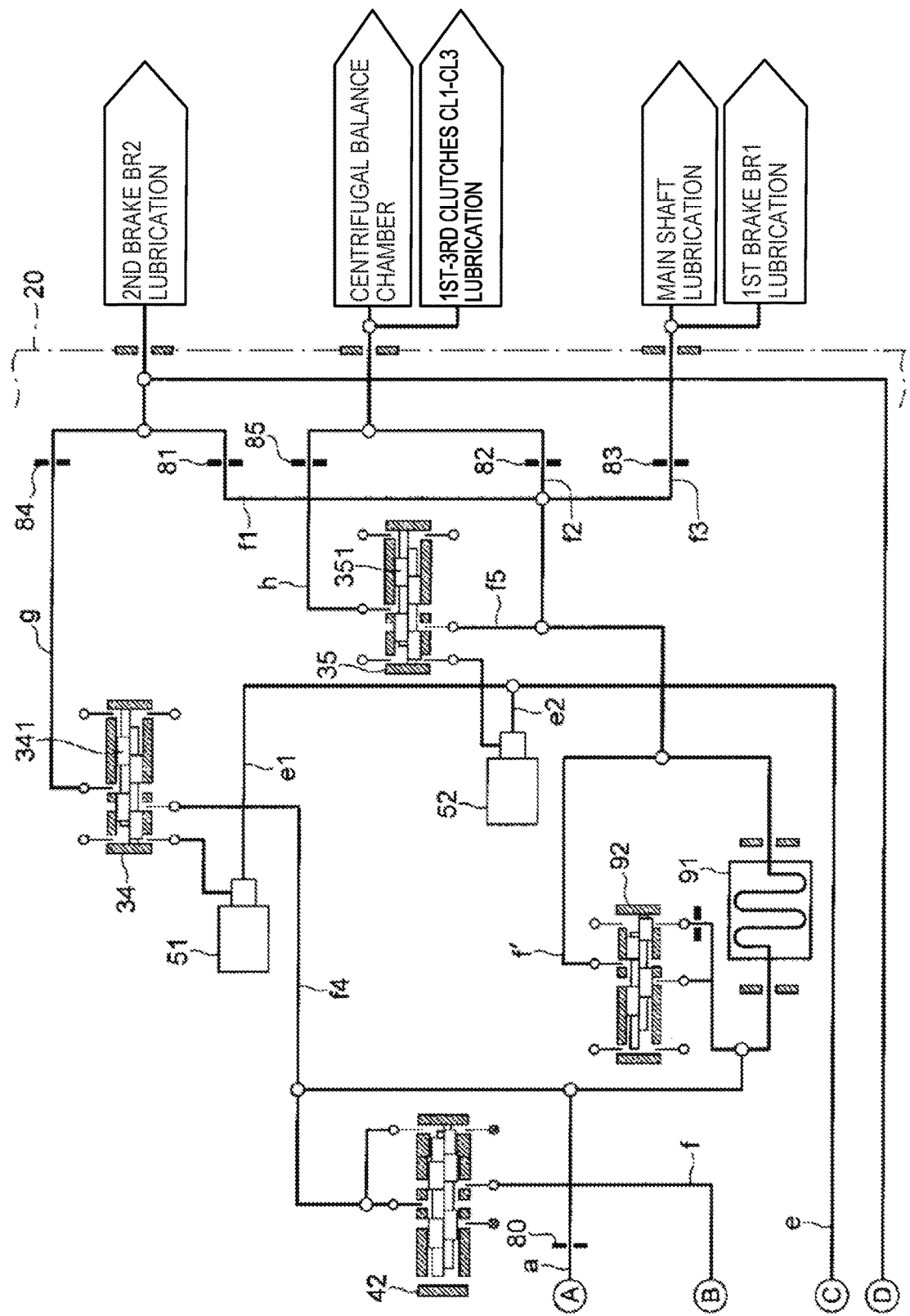
FIG. 6 is a circuit diagram illustrating the remaining part of the hydraulic circuitry of the automatic transmission of the present disclosure.

As illustrated in FIGS. 5 and 6, the hydraulic control device 2 includes, as hydraulic power sources, a mechanical pump (MOP) 21 with a relief valve which is driven by an engine (not illustrated), and an electrical pump (EOP) 22 driven electrically mainly when the engine is stopped.

The hydraulic control device 2 has hydraulic control circuitry 20 which adjusts the hydraulic fluid discharged from these pumps 21 and 22, generates operating pressures for forming the gear stage, such as an engagement pressure and a disengagement pressure supplied to the friction engagement elements BR1, BR2, CL1, CL2, and CL3 for a gear change control, and controls supply of the lubricant to each lubricating part in the transmission including the friction engagement elements BR1, BR2, CL1, CL2, and CL3. Note that the hydraulic control circuitry 20 in FIGS. 5 and 6 is mainly illustrated as circuitry for lubrication.

The hydraulic control circuitry 20 has a plurality of spool valves which are actuated by a hydraulic pressure and a spring force to switch the oil passage and adjust the hydraulic pressure, a plurality of on-off solenoid valves (hereinafter, may also be referred to as "the on-off valves") which are actuated by electrical signals to communicate and intercept the oil passages, and a plurality of linear solenoid valves (hereinafter, may also be referred to as "the linear valves") which are similarly actuated by electrical signals to supply/ discharge and adjust operating pressures. The hydraulic control circuitry 20 is configured to perform a lubricant supply control, etc. for controlling the transmissions and the supply of lubricant by connecting the hydraulic power sources, the valves, and the friction engagement elements through the oil passages.

As valves which constitute the hydraulic control circuitry 20, a regulator valve 31 which adjusts the discharge pressure of the mechanical pump 21 to a given line pressure, a pump shift valve 32 which switches between the line pressure and the discharge pressure of the electric pump 22 and selectively supplies it to the friction engagement element side as a source pressure of the operating pressure for the gear change control, and a lubrication changeover valve 33 of the electric pump 22 for supplying the discharged oil from the electric pump 22 as the lubricant, are provided. Control ports 331 and 332 of the lubrication changeover valve 33 are connected to a line pressure oil passage a which supplies the line pressure, and a discharged oil passage "b" of the electric pump 22, respectively.

When a force caused by the line pressure is larger than a force caused by the discharge pressure of the electric pump 22 and a spring, a spool 333 is located at the left side in the drawing (similarly below), and the discharged oil passage b of the electric pump 22 communicates with a lubricant additional passage c. In the opposite case, the spool 333 is located at the right side, and the discharged oil passage b of the electric pump 22 is connected with the pump shift valve 32 through the lubrication changeover valve 33.

Control ports 321 and 322 at both ends of the pump shift valve 32 are connected to the line pressure oil passage a which supplies the line pressure and the discharged oil passage b of the electric pump 22 through the lubrication changeover valve 33, respectively.

Then, when the force caused by the line pressure and the spring (not illustrated) is larger than the force caused by the discharge pressure of the electric pump 22, a spool is located at the right side in the drawing (similarly below), and the line pressure oil passage a communicates with a transmission source pressure oil passage d. In the opposite case, the spool is located at the left side so that the discharged oil passage b of the electric pump 22 communicates with the transmission source pressure oil passage d.

Note that a gear change controlling source pressure is supplied to a plurality of transmission linear valves 60 (see FIG. 7) which generate engagement pressures for first and second brakes BR1 and BR2, and the first to third clutches CL1, CL2, and CL3, from the transmission source pressure oil passage d through a plurality of transmission source pressure branch oil passages (not illustrated). Then, the engagement pressure generated by each linear valve 60 is supplied to the engagement chamber of each friction engagement element according to the gear stage, and the corresponding friction engagement elements are engaged.

The line pressure oil passage a is led to a reducing valve 41, where the line pressure is reduced to a given pressure by the reducing valve 41 to generate a control pressure. This control pressure is supplied to first and second on/off valves 51 and 52 through first and second branch control pressure oil passages e1 and "e2" which are branched from a control pressure oil passage e, respectively.

When the first on/off valve 51 is ON, the control pressure is supplied to a lubricant increasing valve 34 for the second brake through the first branch control pressure oil passage e1. When the second on/off valve 52 is ON, the control pressure is supplied to a lubricant increasing valve 35 for the first to third clutches through the second branch control pressure oil passage e2. A lubricant increasing operation by these first and second on/off valves 51 and 52, and the lubricant increasing valves 34 and 35 is described later.

The control pressure generated by the reducing valve 41 is also led to a line pressure control linear valve 61 and is supplied to the regulator valve 31 so that a line pressure adjustment pressure for adjusting a pressure setting for the line pressure to a given pressure according to the operating state of the vehicle is generated. Control ports 311 and 312 of the regulator valve 31 are connected to the line pressure oil passage a, and the control pressure oil passage e through the line pressure control linear valve 61, respectively.

When the force caused by the control pressure of the line pressure control linear valve 61 and the spring (not illustrated) is smaller than the force caused by the line pressure, the regulator valve 31 locates a spool 313 at the right side in the drawing (similarly below) so that the line pressure oil passage a communicates with a main lubricant passage f. In the opposite case, the spool 313 is located at the left side, and the line pressure oil passage a communicates with a drain port, in addition to the main lubricant passage f.

The hydraulic control circuitry 20 is provided with a lubricant reducing valve 42 which adjusts a lubricant pressure inside the main lubricant passage f. Note that the main lubricant passage f downstream of the lubricant reducing valve 42 is connected to the line pressure oil passage a through an orifice 80 as a failsafe. For example, the orifice 80 is formed with a small diameter, such as φ0.8 mm, and when a pressure difference occurs by the lubricant pressure of the main lubricant passage f decreasing rapidly, the line pressure oil passage a is connected to the main lubricant passage f.

The main lubricant passage f passes through an oil cooler 91 and then branches to the first to third lubrication branch oil passages f1, f2, and f3 so that the lubricant is supplied to the first and second brakes BR1 and BR2, the first to third clutches CL1, CL2, and CL3, and a main shaft D inside the transmission through fixed orifices 81, 82, and 83, respectively.

The main lubricant passage f is provided with a bypass passage f' which bypasses the oil cooler 91, and the bypass passage f' is provided with a lubricant relief valve 92 for protecting the oil cooler 91.

The main lubricant passage f branches from a location upstream of the oil cooler 91 to a fourth lubrication branch oil passage f4, and the fourth lubrication branch oil passage f4 is connected to the lubricant increasing valve 34 for the second brake described above. The main lubricant passage f also branches from a location downstream of the oil cooler 91 to a fifth lubrication branch oil passage f5, and the fifth lubrication branch oil passage f5 is connected to the lubricant increasing valve 35 for the first to third clutches.

When the first on/off valve 51 is ON, a spool 341 of the lubricant increasing valve 34 for the second brake is located at the right side due to the control pressure supplied from the first branch control pressure oil passage e1, and the fourth lubricant branch oil passage f4 communicates with a lubricant increasing passage g for the second brake. The lubricant is supplied to the second brake BR2 through the lubricant increasing valve 34 for the second brake and an increasing orifice 84.

When the second on/off valve 52 is ON, a spool 351 of the lubricant increasing valve 35 for the first to third clutches is located at the right side due to the control pressure supplied from the second branch control pressure oil passage e2, and the fifth lubrication branch oil passage f5 communicates with a lubricant increasing passage h for the first to third clutches CL1, CL2, and CL3. The lubricant is supplied to the first to third clutches CL1, CL2, and CL3 through the lubricant increasing valve 35 for the first to third clutches and an increasing orifice 85.

Further, the hydraulic control circuitry 20 is provided with the lubrication changeover valve 33 of the electric pump 22 for supplying the discharged oil from the electric pump 22 as the lubricant for the second brake BR2. The line pressure is supplied from the line pressure oil passage a to the lubrication changeover valve 33 of the electric pump 22 as the control pressure, and when the spool 333 is located at the left side due to this control pressure, the discharged oil passage b of the electric pump 22 communicates with the lubricant additional passage c, and when the electric pump 22 is actuated in this condition, its discharged oil is supplied to the second brake BR2 through the lubricant additional passage c as the lubricant.

Figure 7:
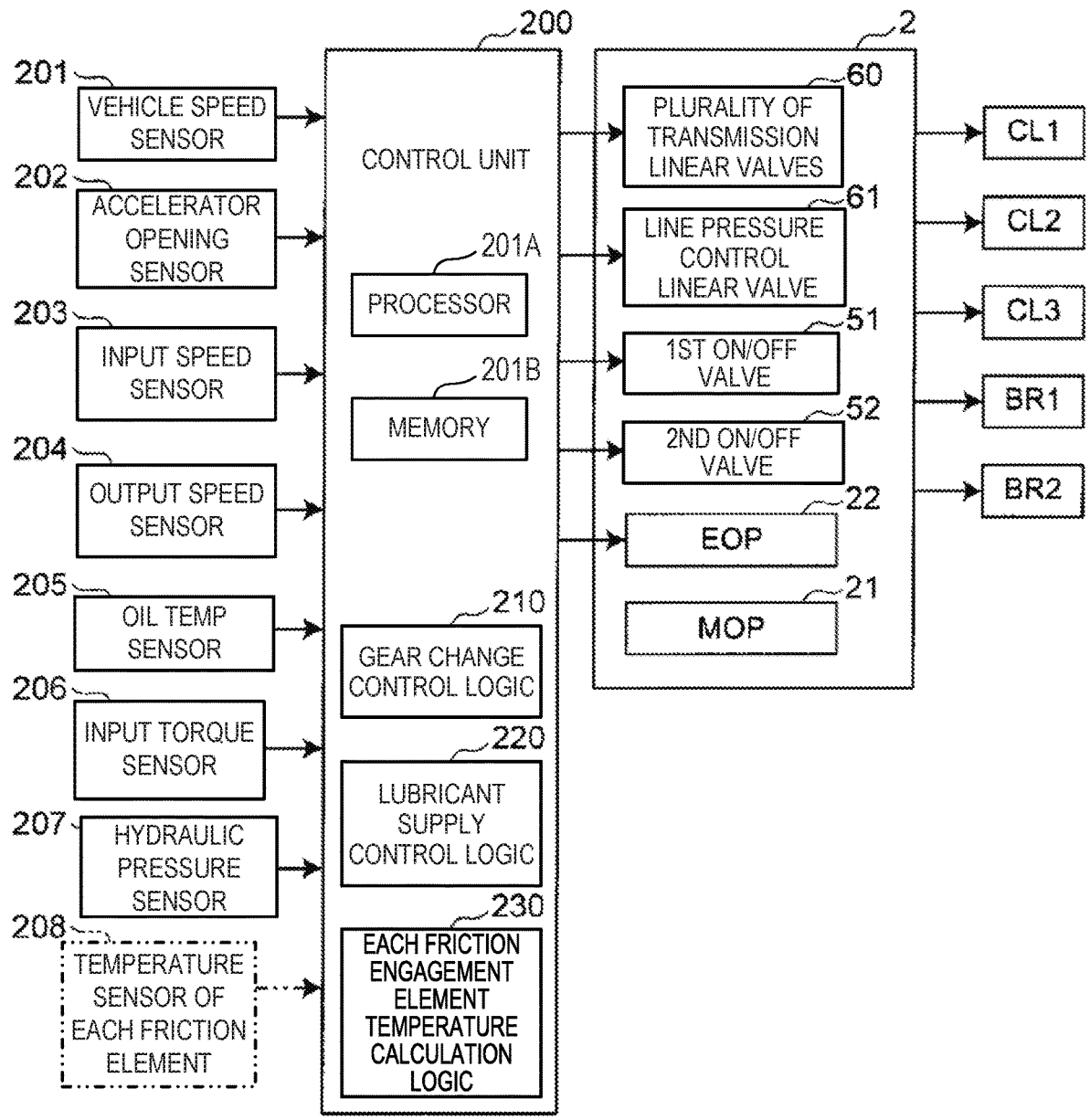
FIG. 7 is a system diagram of the automatic transmission of the present disclosure.

As illustrated in FIG. 7, the automatic transmission 10 is provided with a control unit 200 as a control device for controlling the transmission control valve 60, the lubricating control valves 51, 52, and 61, and the electric pump 22, which are described above. Various external signals which are used for the control of the vehicle are inputted into the control unit 200.

As the input signals to the control unit 200, there may be detection signals by a vehicle speed sensor 201 which detects a traveling speed of the vehicle, an accelerator opening sensor 202 which detects an accelerator opening (a depressing amount of an accelerator pedal), an engine speed sensor 203 which detects an engine speed as an input speed inputted into the automatic transmission 10, an output speed sensor 204 which detects an output speed outputted from the automatic transmission 10, an oil temperature sensor 205 which detects a temperature of lubricant (ATF temperature) stored inside an oil storing part at the bottom of the transmission casing 11 of the automatic transmission 10, an input torque sensor 206 which detects an output torque of the engine as an input torque inputted into the automatic transmission 10, and a hydraulic pressure sensor 207 which detects a hydraulic pressure of the hydraulic fluid supplied to each friction engagement element.

The control unit 200 includes a processor (e.g., a central processing unit (CPU)) 201A configured to execute various logic, which may be embodied in instructions stored as software or firmware in memory 201B (e.g., read-only memory (RAM) and/or random access memory (RAM)), or may be embodied in logic circuitry such as an application-specific integrated circuit (ASIC). Examples of the logic include gear change control logic 210 which controls a gear change by outputting a control signal to the hydraulic control device 2 of the automatic transmission 10 based on detection values from the various sensors including the vehicle speed sensor 201, the accelerator opening sensor 202, the engine speed sensor 203, and the output speed sensor 204, lubricant supply control logic 220 and each friction engagement element temperature calculation logic 230 (which corresponds to the vehicle-propelling friction engagement element temperature detector, and the other friction engagement element temperature detector in the present disclosure) as each friction engagement element detector (described below).

The lubricant supply control logic 220 has a plurality of lubricant supply patterns in which supply destinations of lubricant and supply amounts of the lubricant supplied to the supply destinations are set. The lubricant supply control logic 220 outputs the control signal to the hydraulic control device 2 based on the input signals from the input speed sensor 203, the output speed sensor 204, the oil temperature sensor 205, the input torque sensor 206, and the hydraulic pressure sensor 207 to perform the following lubricant supply control.

The lubricant supply control is to control switching of the supply pattern of the lubricant supplied to each friction engagement element according to the state of the vehicle in order to improve fuel efficiency by reducing the stirring resistance and the drag of the lubricant in each friction engagement element, and the discharge loss of the oil pump, while suppressing the thermal loads of the friction engagement elements BR1, BR2, CL1, CL2, and CL3.

As illustrated in FIG. 8, the lubricant supply control logic 220 is provided with a plurality of lubricant supply patterns for switching the supply destinations of the lubricant and the amount of lubricant supplied to each supply destination. The plurality of lubricant supply patterns are switched according to a cooling demand level for the second brake BR2, cooling demand levels for the first to third clutches CL1, CL2, and CL3 (in detail, the cooling demand levels of low L, high H, and the maximum HH).

The cooling demand level is determined by whether a parameter related to the temperature of each friction engagement element is greater than a threshold. Here, parameters used for determining the cooling demand level to switch between the plurality of lubricant supply patterns, and thresholds provided for the respective parameters are described.

As the parameters used for determining the cooling demand level to switch between the plurality of lubricant supply patterns, values which contribute to an increase in the temperature (generation of heat) of each friction engagement element are used. In detail, an input torque detected by the input torque sensor 206, an input speed detected by the input speed sensor 203, a temperature of the second brake B2 and temperatures of the first to third clutches CL1, CL2, and CL3 calculated by the respective friction engagement element temperature calculation logics 230 are used.

Since the input torque is in proportional to the temperature of each friction engagement element, an increase in the temperature of each friction engagement element can be estimated. A speed difference $\Delta N$ increases as the input speed increases. Since this speed difference $\Delta N$ is in proportional to the temperature of each friction engagement element, an increase in the temperature of each friction engagement element can be estimated, similar to the input torque. The temperature of each friction engagement element can be detected directly.

In this embodiment, the temperature of each friction engagement element as the parameter for switching the supply destination and the supply amount of the lubricant to be supplied to each friction engagement element is calculated by the corresponding friction engagement element temperature calculation logic 230. The temperature of each friction engagement element is calculated based on the input speed, the output speed, the input torque, the hydraulic pressure of the oil passage which communicates with the friction engagement element, and, as described later, a cooling temperature by heat release of the friction engagement element to an atmospheric air therearound and the lubricant.

In detail, a temperature T1 of each friction engagement element calculated by the corresponding friction engagement element temperature calculation logic 230 can be calculated based on a temperature T0 of the friction engagement element calculated in the last cycle, an absorbing energy E of the friction engagement element, a heat capacity Q of the friction plates of the friction engagement element, a cooling temperature (Tc×tc) which can be calculated based on a heat release rate (a temperature drop rate of the friction engagement element) Tc from the friction engagement element to the surrounding atmospheric air and the lubricant and a cycle time (a period of time required for one calculation) tc, and the following Equation 1. Note that the ATF temperature detected by the oil temperature sensor 205 is used for an initial value of the friction engagement element temperature T0 calculated in the last cycle.

$$T1 = T0 + E/Q + Tc \times tc \qquad (1)$$

The absorbing energy E of each friction engagement element can be calculated based on the speed difference ΔN between the input side and the output side of the friction engagement element, a transmitting torque Trq of the friction engagement element, and the following Equation 2.

$$E = \Delta N \times Trq \qquad (2)$$

The speed difference ΔN is calculated based on the input speed detected by the input speed sensor 203, the output speed detected by the output speed sensor 204, the gear stage, and a velocity diagram. The speed difference ΔN is calculated by a rotational difference produced between the drum member and the hub member of the friction engagement element which is in the disengaged state with the current gear stage and is about to be in the engaged state with the next gear stage.

The transmitting torque Trq is calculated based on the number of friction surfaces "n," a piston return spring set load Fr, a friction coefficient μ, a hydraulic oil pressure Pa detected by the hydraulic pressure sensor 207, a piston major diameter Dpo, a piston minor diameter Dpi, a friction surface major diameter Do of each friction engagement element, a friction surface minor diameter Di of the friction engagement element, and the following Equation 3.

$$Trq = \frac{n\mu}{4}\left(\pi Pa\frac{Dpo^2 - Dpi^2}{4} - Fr(Do + Di)\right) \qquad (3)$$

The cooling temperature Tc of each friction engagement element of Equation 1 is calculated based on the temperature T1 of the friction engagement element (a calculated value which is calculated in the last cycle), a generated heat temperature ΔT of the friction engagement element calculated from the ATF temperature ([the temperature of the friction engagement element]−[the ATF temperature]), and a map (FIG. 9) indicative of a relation of a cooling temperature Tc of the friction engagement element against the generated heat temperature ΔT of the friction engagement element (a temperature drop rate of the friction engagement element). In detail, as illustrated in FIG. 9, the cooling temperature Tc of the friction engagement element is calculated by reading a value of the cooling temperature Tc 1 of the friction engagement element when the generated heat temperature of the friction engagement element is ΔT1.

Figure 9:
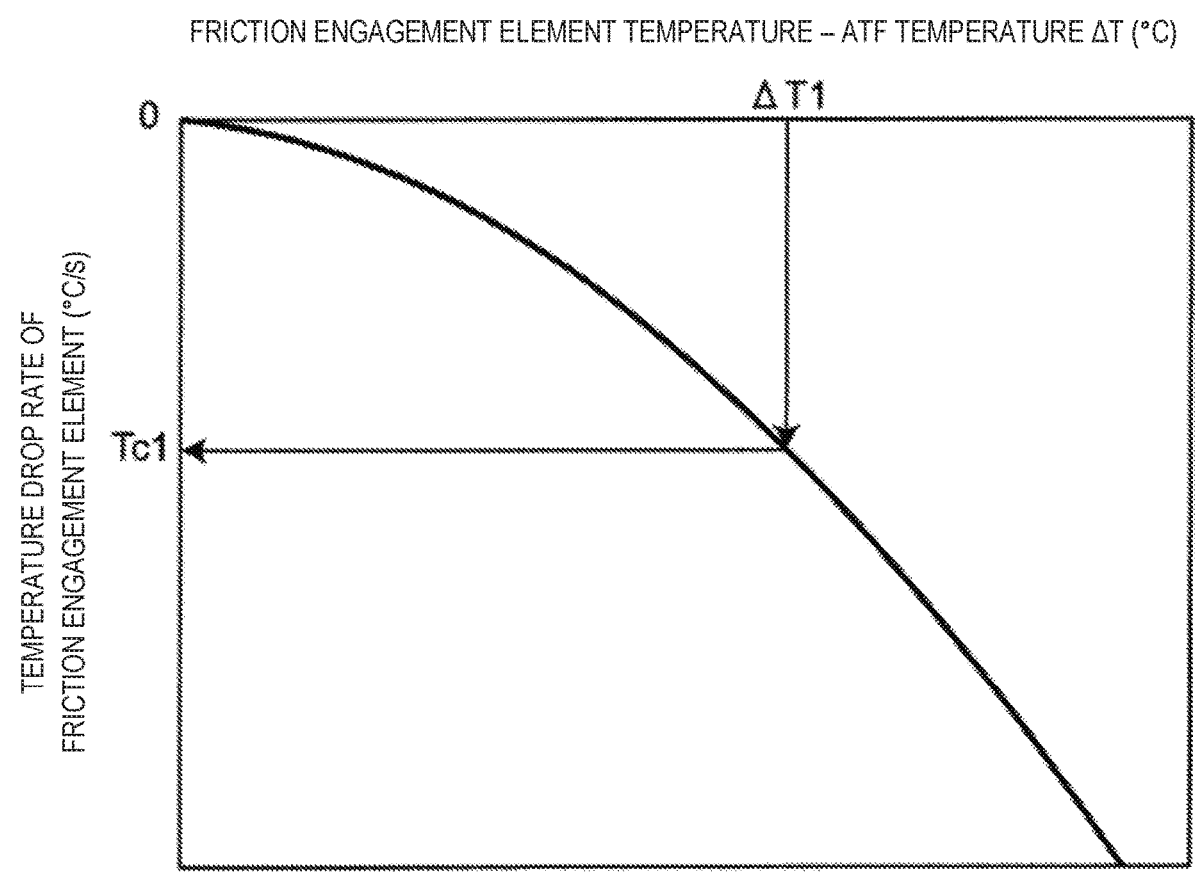
FIG. 9 is a map illustrating one example of a cooling characteristic of temperature of each friction engagement element in the automatic transmission of the present disclosure.

The map of the cooling temperature Tc of each friction engagement element against the generated heat temperature ΔT of the friction engagement element of FIG. 9 is calculated by an approximation in which the temperature drop rate (cooling temperature) of the given friction engagement element is derived based on experimental values, when a given flow rate of lubricant is supplied to the given friction engagement element engaged in a given gear change state. Note that the map of the cooling temperature Tc of a friction engagement element against the generated heat temperature ΔT of the friction engagement element is provided for every friction engagement element engaged in a plurality of gear change states.

The thresholds of the parameters (the input torque, the input speed, the temperature of each friction engagement element) are set under conditions in which the generation of heat of each friction engagement element is comparatively little, and an increase in the amount of lubricant is needed. For example, a threshold Tq1 of the input torque is set as 250 Nm, a threshold Nin of the input speed is set as 3,000 rpm, thresholds Tcl1, Tcl2, and Tcl3 of the temperatures of the first to third clutches CL1, CL2, and CL3 are set as 150° C., and a first threshold Tlow of the temperature of the second brake is set as 150° C. Note that for the temperature of the second brake, a second threshold Thigh which is a temperature higher than the first threshold is set. For example, the second threshold Thigh is set as 180° C.

As illustrated in FIG. 8, the plurality of lubricant supply patterns are set as Patterns 1 to 5. Here, examples of the plurality of lubricant supply patterns, conditions of the parameter for switching each lubricant supply pattern, and scenes assumed by the lubricant supply patterns (states of the vehicle) are described.

The plurality of lubricant supply patterns are switched according to the cooling demand level for the second brake BR2, and the cooling demand level for the first to third clutches CL1, CL2, and CL3. For example, as for the cooling demand levels, the low cooling demand level L which is a cooling demand level at which the cooling of each friction engagement element can secure the durability by cooling it with a supply amount of lubricant which is always supplied to each friction engagement element, the high cooling demand level H which is a cooling demand level higher than the low cooling demand level L, and the maximum cooling demand level HH which is a cooling demand level higher than the high cooling demand level H in the second brake BR2, are set.

When the cooling demand level for the second brake BR2 is low (L) and the cooling demand level for the first to third clutches CL1, CL2, and CL3 is low (L), Pattern 1 is executed as the first lubricant supply pattern.

The condition of each parameter is that the temperature of the second brake BR2 is below the first threshold Tlow, and all the parameters (the input torque, the input speed, the temperatures of the first to third clutches CL1, CL2, and CL3) for determining the supply amounts of the lubricant to the first to third clutches CL1, CL2, and CL3 are below the respective thresholds Tq1, Nin, Tcl1, Tcl2, and Tcl3.

In Pattern 1, a given first flow rate (small) of the lubricant is supplied to the second brake BR2 through the first lubrication branch oil passage f1. A given second flow rate (small) of the lubricant is supplied to the first to third clutches CL1-CL3 through the second lubrication branch oil passage f2.

An assumed scene is a situation where the amount of lubricant supplied to each friction engagement element does not need to be increased, such as when the load is low, when the vehicle travels with low fuel consumption, during a coasting down (during a slowdown for the transmission), and before an engine startup (e.g., the engine speed is lower than 500 rpm). Thus, in the condition where the thermal load of each friction engagement element is not high (the cooling demand level is low (L)), by reducing the lubricant amount, the stirring resistance and the drag of the lubricant of the friction engagement element, and the discharge loss of the oil pump are suppressed.

When the cooling demand level for the second brake BR2 is low (L) and the cooling demand level for the first to third clutches CL1, CL2, and CL3 is high (H), Pattern 2 is executed as the second lubricant supply pattern.

The condition of each parameter is that the temperature of the second brake BR2 is below the first threshold Tlow, and one or more of the parameters for determining the supply amounts of the lubricant to the first to third clutches CL1-CL3 (the input torque, the input speed, the temperatures of the first to third clutches CL1-CL3) are given value(s) or above.

In Pattern 2, the lubricant is supplied to the second brake BR2 at the given first flow rate (small) through the first lubrication branch oil passage f1. The lubricant is supplied to the first to third clutches CL1-CL3 at a given third flow rate (large) greater than the given second flow rate through the lubricant increasing passage h for the first to third clutches in addition to the second lubricant branch oil passage f2.

An assumed scene is a situation where the ATF temperature is a comparatively low (e.g., the temperature of the second brake BR2 may not reach the first threshold Tlow), and an increase in the supply amount of lubricant to the second brake BR2 is not required, but an increase in the supply amounts of the lubricant to the first to third clutches CL1-CL3 is required, such as when the load is middle load (e.g., the load is higher than the low load of an idle state, and the load is lower than the high load, such as when the vehicle is climbing a slope), and the vehicle is accelerating, up-shifting, and down-shifting by a torque demand.

In detail, as illustrated in FIG. 2, when the vehicle is accelerating, up-shifting, and down-shifting by the torque demand (e.g., a down-shifting from 6th gear to 3rd gear), since a re-catching occurs in the first to third clutches CL1-CL3 (the disengaged state and the engaged state are switched), the cooling demand level to the first to third clutches CL1-CL3 becomes higher.

On the other hand, during acceleration and up-shifting, there is no situation of catching of the second brake BR2 (from the disengaged state to the engaged state), and a temperature rise of the second brake BR2 caused by a slip of second brake BR2 like when the vehicle starts moving (1st gear) does not occur.

Moreover, during down-shifting by the torque demand, the catching of the second brake BR2 occurs (from the disengaged state to the engaged state), the temperature rise of the second brake BR2 in this case is smaller than the temperature rise of the second brake BR2 in the slipped state of the second brake BR2, and therefore, the cooling demand level for the second brake BR2 is lower.

Thus, in the state where the thermal loads of the first to third clutches CL1, CL2, and CL3 are high, and the thermal load of the second brake BR2 is not high, the stirring resistance and the drag of the lubricant in the second brake BR2, and the discharge loss of the oil pump are suppressed by increasing the supply amounts of the lubricant to the first to third clutches CL1, CL2, and CL3 to secure the durability of the first to third clutches CL1, CL2, and CL3, and reducing the supply amount of lubricant to the second brake BR2.

Other than the condition of each parameter described above, Pattern 2 is also applied to a given period after an engine startup (e.g., a period within 3 seconds after the engine speed becomes 500 rpm or higher).

In detail, normally, immediately after a startup of the vehicle, the lubricant inside the centrifugal balance chambers P32, P42, and P52 may be flowed out and stored in an oil pan. In this case, if an engaging operation is performed, the hydraulic fluid is supplied to the engagement hydraulic chambers P31, P41, and P51 in a state where the lubricant has not been supplied to the centrifugal balance chambers P32, P42, and P52.

A given engagement hydraulic pressure for engaging each friction engagement element is set as a pressure on the basis of the lubricant being supplied to the centrifugal balance chambers P32, P42, and P52. That is, if the given engagement hydraulic pressure is supplied to the centrifugal balance chambers P32, P42, and P52 while the lubricant has not fully been supplied thereto, a timing of the engagement becomes earlier, and therefore, a shock may be given to people onboard.

In order to solve this problem, immediately after the startup, by increasing the amounts of lubricant supplied to the first to third clutches CL1, CL2, and CL3 as described above (the given third flow rate), the lubricant can be promptly supplied to the centrifugal balance chambers P32, P42, and P52.

Moreover, as other conditions, Pattern 2 is also applied to a case where the ATF temperature is a given value Toil (e.g., 100° C.) or above.

In detail, when the ATF temperature is the given value Toil or above, since in this embodiment a transmission control module (TCM) disposed inside the oil pan may be heat-damaged by the high-temperature oil, it is necessary to lower the ATF temperature.

By using Pattern 2 as the lubricant supply pattern, since the drag of the oil passage passing through the oil cooler 91 (downstream of the oil cooler 91) can be lowered, the oil amount passing through the oil cooler 91 can be increased, and therefore, effectively lowering the ATF temperature.

In detail, in the second lubricant supply pattern (Pattern 2), since the lubricant increasing valve 35 for the first to third clutches is opened by the second on/off valve 52, the fifth lubrication branch oil passage f5 which branches downstream of the oil cooler and the lubricant increasing passage h for the first to third clutches communicate with each other. Therefore, in addition to the first to third lubrication branch oil passage f1-f3, since the lubricant increasing passage h for the first to third clutches also communicates with the fifth lubrication branch oil passage f5, the drag downstream of the oil cooler 91 decreases, and the flow rate of the lubricant which flows through the main lubricant passage f increases. As a result, since the flow rate of the lubricant cooled by the oil cooler 91 can be increased, the ATF oil temperature can be reduced.

Further, in Pattern 2, since the lubricant increasing valve 34 for the second brake is closed by the first on/off valve 51, the fourth lubrication branch oil passage f4 which branches upstream of the oil cooler 91 does not communicate with the lubricant increasing passage g for the second brake which bypasses the oil cooler 91. Therefore, the lubricant is not supplied to the second brake BR2 from the lubricant increasing passage g for the second brake which does not pass through the oil cooler in the hydraulic control circuitry 20, and thereby, the amount of lubricant which flows through the oil passage passing through the oil cooler 91 can be further increased.

When the cooling demand level for the second brake BR2 is high (H) and the cooling demand level for the first to third clutches CL1, CL2, and CL3 is low (L), Pattern 3 is executed as the third lubricant supply pattern.

The condition of each parameter is that the temperature of the second brake BR2 is the first threshold Tlow or above, and all the parameters for determining the supply amounts of the lubricant to the first to third clutches CL1-CL3 (the input torque, the input speed, the temperatures of the first to third clutches CL1-CL3) are below the given values.

In Pattern 3, a given fourth flow rate (large) of the lubricant greater than the given first flow rate is supplied to the second brake BR2 through the lubricant increasing passage g for the second brake in addition to the first lubrication branch oil passage f1. The given second flow rate (small) of the lubricant is supplied to the first to third clutches CL1-CL3 through the second lubrication branch oil passage f2.

An assumed scene is a situation where an increase in the supply amount of lubricant to the second brake BR2 is required, but an increase in the supply amounts of the lubricant to the first to third clutches CL1-CL3 is not required, such as during the high load when the vehicle is climbing a slope, and when the traffic is congested.

In detail, during a downshift when the vehicle transits to climbing a slope, a slip occurs in the second brake BR2. Particularly, since in the second brake BR2 more number of friction plates are set than other friction engagement elements in order to secure the torque capacity when the vehicle starts traveling (see FIG. 4), the heat generated in the slipped state also becomes larger than other friction engagement elements. Therefore, the cooling demand level for the second brake BR2 becomes higher. Moreover, when the vehicle starts traveling on a slope, or an accelerator hill hold is performed, since the second brake BR2 becomes in the slipped state with the load being high, the temperature of the second brake BR2 tends to be the first threshold Tlow or above, and therefore, the cooling demand level for the second brake BR2 becomes higher also in such a case.

Since, during the traffic congestion, a start and stop of the vehicle are repeated, the frequency of the slipped state of the second brake BR2 increases, and therefore, the cooling demand level for the second brake BR2 becomes higher.

Thus, in the state where the cooling demand level for the second brake BR2 is high and the cooling demand level for the first to third clutches CL1, CL2, and CL3 is low, the stirring resistance and the drag in the first to third clutches CL1, CL2, and CL3, and the discharge loss of the oil pump are suppressed by increasing the supply amount of lubricant to the second brake BR2 to secure the durability of the second brake BR2, and reducing the supply amounts of the lubricant to the first to third clutches CL1, CL2, and CL3.

When the cooling demand level for the second brake BR2 is high (H) and the cooling demand level for the first to third clutches CL1, CL2, and CL3 is high (H), Pattern 4 is executed as the fourth lubricant supply pattern.

The condition of each parameter is that the temperature of the second brake BR2 is the given threshold Tlow or above, and one or more of the parameters for determining the supply amounts of the lubricant to the first to third clutches CL1-CL3 (the input torque, the input speed, the temperatures of the first to third clutches CL1-CL3) are the given value(s) or above.

In Pattern 4, the given fourth flow rate (large) of the lubricant greater than the given first flow rate is supplied to the second brake BR2 through the lubricant increasing passage g for the second brake in addition to the first lubrication branch oil passage f1. The given third flow rate (large) of the lubricant which is greater than the given second flow rate is supplied to the first to third clutches CL1-CL3 through the lubricant increasing passage h for the first to third clutches in addition to the second lubricant branch oil passage f2.

An assumed scene is a situation where the ATF temperature is comparatively high (e.g., the temperature of the second brake BR2 may reach the first threshold Tlow), and an increase in the supply amount of lubricant to the second brake BR2 is required and an increase in the supply amounts of the lubricant to the first to third clutches CL1-CL3 is required, such as during the middle load (e.g., the load is higher than the low load of an idle state, and the load is lower than the high load when the vehicle is climbing a slope), during acceleration, during up-shifting, and during down-shifting by the torque demand.

In detail, in a traveling scene similar to Pattern 2, when the ATF temperature is comparatively high, the cooling demand levels for the second brake BR2 and the first to third clutches CL1-CL3 may become higher.

Thus, in the state where the cooling demand levels for the second brake BR2 and the first to third clutches CL1, CL2, and CL3 are high, the priority can be given to the assurance of the durability of the second brake BR2 and the first to third clutches CL1, CL2, and CL3 by increasing the supply amounts of the lubricant to the second brake BR2 and the first to third clutches CL1, CL2, and CL3.

Pattern 4 is also applied to a case where the automatic transmission is failed, in addition to the condition of each parameter described above.

In detail, for example, if at least one of a condition where an abnormality of the input speed sensor 203 is detected, when an abnormality of the oil temperature sensor 205 is detected, and an abnormality of the input torque sensor 206 which detects the torque inputted into the transmission from the engine (when an input torque information signal is in a failed status) is satisfied, it is determined to be a failed state.

Therefore, in the failed state, since the flow rates of the lubricant are increased for the second brake BR2 and the first to third clutches CL1, CL2, and CL3 by Pattern 4, burning or seizure of each friction engagement element is suppressed and the priority is given to the reliability.

When the cooling demand level for the second brake BR2 is the maximum (HH), Pattern 5 is executed as the fifth lubricant supply pattern.

The condition of each parameter is the temperature of the second brake BR2 is higher than the second threshold Thigh (e.g., 180° C.) higher than the first threshold Tlow.

In Pattern 5, a given fifth flow rate (extra large) of the lubricant greater than the given fourth flow rate (large) is supplied to the second brake BR2 through the lubricant additional passage c connected to the discharged oil passage b of the electric pump 22, in addition to the first lubricant branch oil passage f1 and the lubricant increasing passage g for the second brake. The given second flow rate of the lubricant is supplied to the first to third clutches CL1-CL3 through the second lubrication branch oil passage f2.

An assumed scene is a situation where an excessive thermal load is applied to the second brake BR2 when the load is high, such as during an accelerator hill hold and towing. For example, the accelerator hill hold is a case where the vehicle is maintained at a stopped state on a slope by the driver stepping on the accelerator pedal to use a demanded driving force without using a brake-pedal operation. In the accelerator hill hold, since a slide-down torque caused by the weight of the vehicle on the slope and the demanded driving torque is balanced and the braking state is maintained, a speed difference occurs between the drive source and the drive wheels. By this speed difference, the second brake BR2 between the drive source and the drive wheels slips to apply an excessive thermal load to the second brake BR2, and therefore, the durability of the second brake BR2 tends to be lowered.

In such a situation, by giving the maximum priority to cooling of the second brake BR2, the durability of the second brake BR2 is secured.

Note that the first to fifth lubricant supply patterns in FIG. 8, and the map illustrated in FIG. 9 are stored in advance in memory (not illustrated) of the control unit 200.

Figure 10:
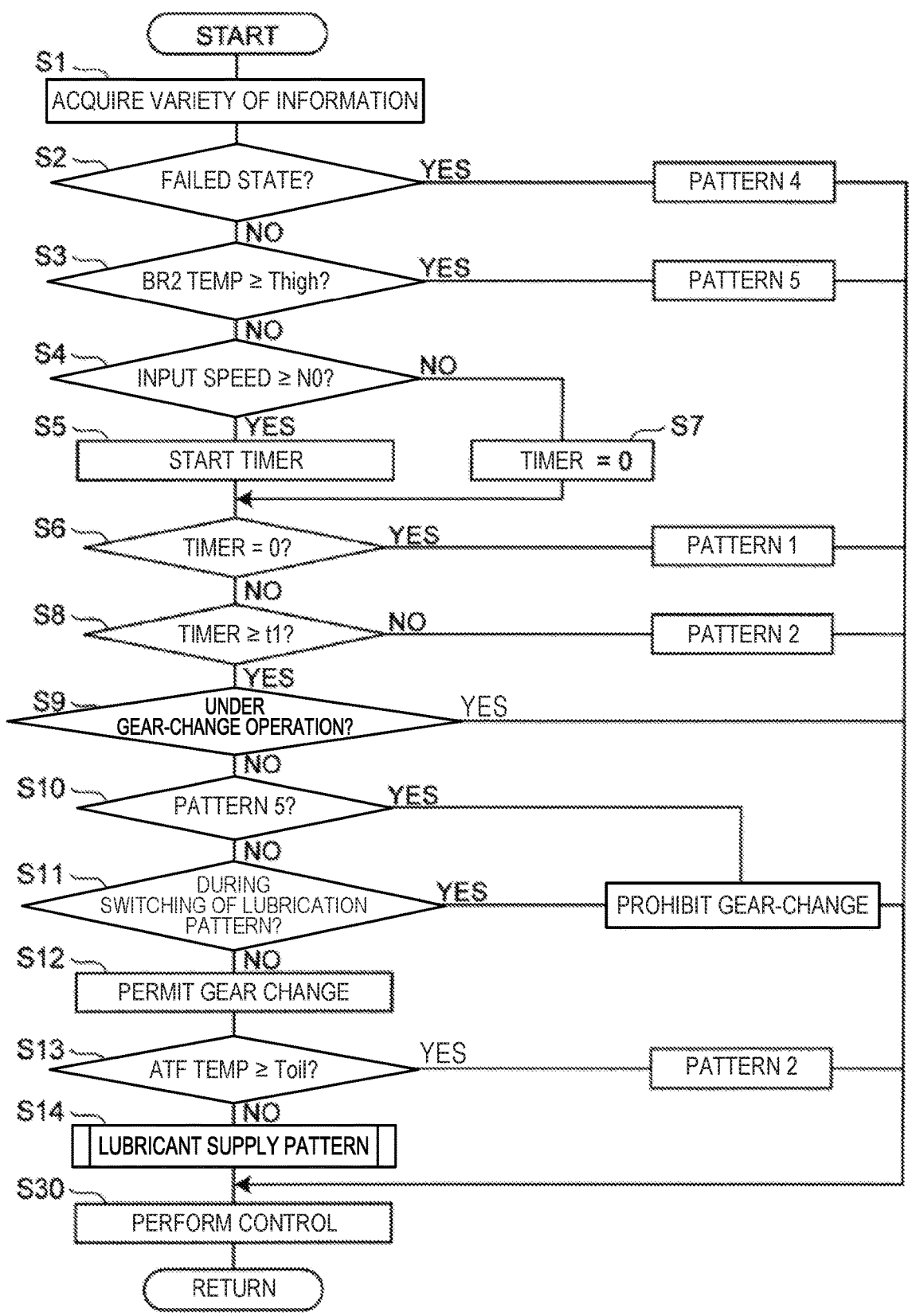
FIG. 10 is a flowchart of a lubricant supply control of the automatic transmission of the present disclosure.
Figure 11:
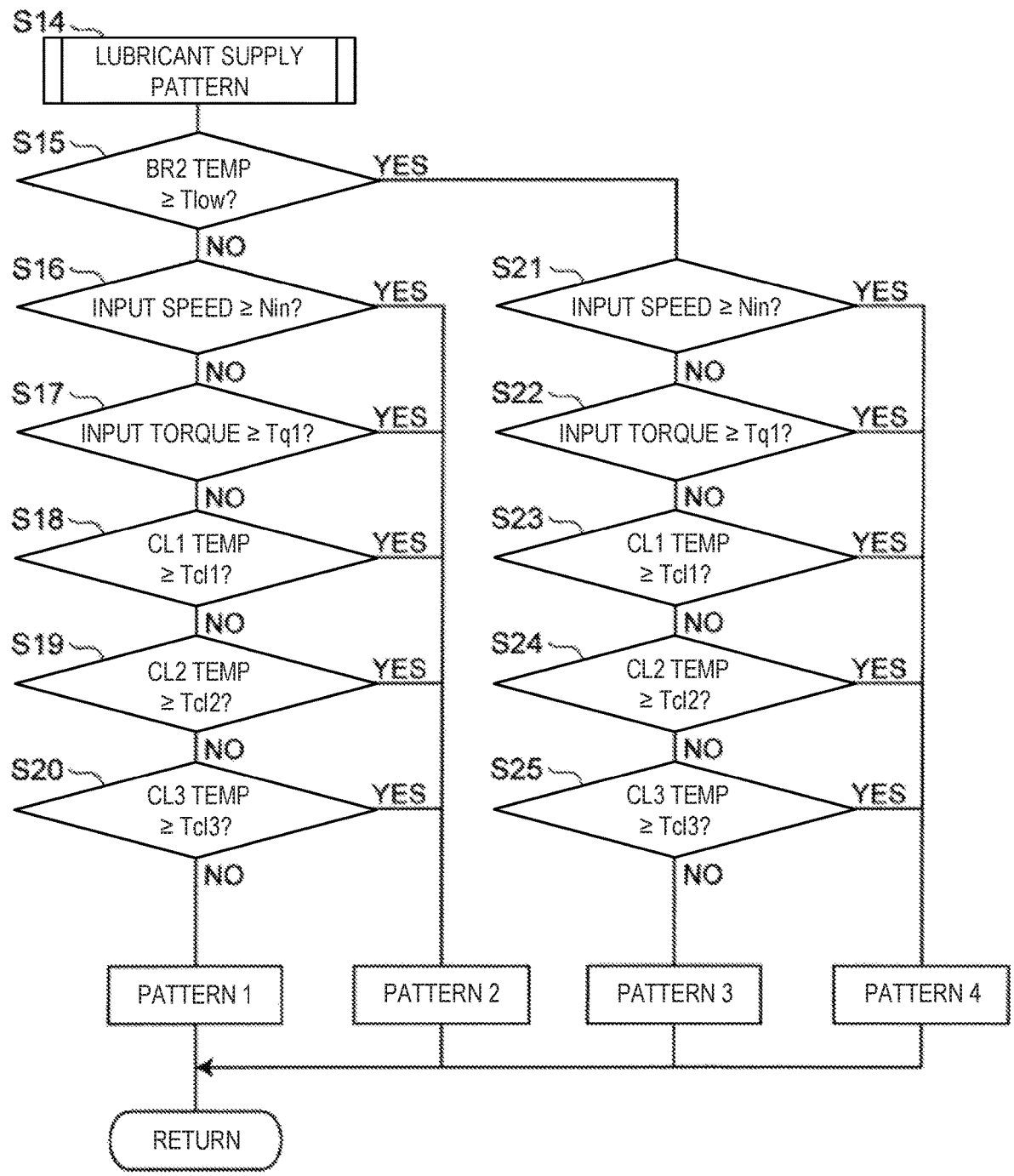
FIG. 11 is a flowchart illustrating the content of a lubricant supply pattern determining step in the flowchart of FIG. 10.

One example of operation of the lubricant supply control is described more concretely with reference to flowcharts of FIGS. 10 and 11.

At Step S1 of FIG. 10, variety of information required for the lubricant supply control is detected. At Step S1, various detection values, such as an accelerator opening, an oil temperature, an input speed, an output speed, an input torque, and a hydraulic pressure, are read.

At the subsequent Step S2, the control unit determines whether it is in the failed state. If it is in the failed state, the control unit determines the lubricant supply pattern is the fourth lubricant supply pattern, and then shifts to Step S30, where the lubricant is supplied to the second brake BR2 and the first to third clutches CL1, CL2, and CL3 in Pattern 4. Since in the failed state the flow rates of lubricant of the second brake BR2 and the first to third clutches CL1, CL2, and CL3 are increased by the fourth lubricant supply pattern, the burning or seizure of each friction engagement element is suppressed and the priority is given to the reliability.

Note that, by the determination of the failed state at Step S2, as described above, the control unit determines that it is in the failed state when at least one of abnormalities of the input speed sensor 203, the oil temperature sensor 205, and the input torque sensor 206 is detected. If determined that it is not in the failed state at Step S2, the control unit shifts to Step S3.

At Step S3, the control unit determines whether the temperature of the second brake BR2 (vehicle-propelling friction engagement element) is the second threshold Thigh (e.g., 180° C.) or above based on the temperature of the second brake calculated by a second brake temperature calculation logic.

If the temperature of the second brake BR2 is the second threshold Thigh or above, the control unit determines the lubricant supply pattern is the fifth lubricant supply pattern, and it shifts to Step S30, where the lubricant is supplied to the second brake BR2 and the first to third clutches CL1, CL2, and CL3 in Pattern 5.

As a scene where the temperature of the second brake BR2 becomes the second threshold Thigh or above, there is a case where the excessive thermal load is applied to the second brake BR2 because of the high load, such as the accelerator hill hold and towing. Thus, in such a state where the excessive thermal load is applied to the second brake BR2, the amount of lubricant supplied to the second brake in the fifth lubricant supply pattern (Pattern 5) is made extra large as described above, but the amounts of lubricant supplied to the first to third clutches CL1, CL2, and CL3 are not increased. Thus, since a ratio of the lubricant supplied to the second brake BR2 can be relatively increased, the second brake BR2 can be cooled more effectively.

At Step S3, if the temperature of the second brake BR2 is below the second threshold Thigh, the control unit shifts to Step S4. At Step S4, it is determined whether the input speed is an idle speed N0 (e.g., 500 rpm) or above. If the input speed is the idle speed N0 or above at Step S4, the control unit shifts to Step S5 where it starts a timer, and then shifts to Step S6. On the other hand, if the input speed is below the idle speed N0 at Step S3, the control device shifts to Step S7 where it sets the timer as 0, and it then shifts to Step S6.

At Step S6, the control device determines whether the timer is 0. If the timer is determined to be 0 at Step S6, i.e., if the engine is before a startup (a period before the first combustion prior to the idle speed), the control unit determines the lubricant supply pattern as the first lubricant supply pattern, it then shifts to Step S30, where it supplies the lubricant to the second brake BR2 and the first to third clutches CL1, CL2, and CL3 in Pattern 1, and it then returns. In the condition before the lubrication is needed before an engine startup, the fuel efficiency is improved by not increasing the amounts of lubricant supplied to the second brake BR2 and the first to third clutches CL1, C12, and CL3.

At Step S6, if the timer is not 0, the control unit shifts to Step S8 where it determines whether the timer is 3 seconds or more. If the timer is below a given time t1 (e.g., 3 seconds) (e.g., within 3 seconds after a startup), the control unit determines that the lubricant supply pattern is the second lubricant supply pattern, and then shifts to Step S30, where it supplies the lubricant to the second brake BR2 and the first to third clutches CL1, CL2, and CL3 in Pattern 2, and it then returns. The amounts of lubricant supplied to the first to third clutches CL1, CL2, and CL3 are increased while suppressing the amount of lubricant supplied to the second brake BR2.

Thus, immediately after the startup, by increasing the amounts of lubricant (given third flow rate) supplied to the first to third clutches CL1, CL2, and CL3 as described above, the shock to person(s) onboard caused by the given engagement hydraulic pressure being supplied in the state where the lubricant has not fully been supplied to the centrifugal balance chambers P32, P42, and P52 can be suppressed by promptly supplying the lubricant to the centrifugal balance chambers P32, P42, and P52.

If the timer is greater than the given time t1 at Step S8, the control unit shifts to Step S9, where the control device determines whether it is under a gear change operation. The determination of being under the gear change operation is determined by detecting a gear change start timing and a gear change end timing. For example, the gear change start timing is determined based on whether a gear change command is outputted from the gear change command detector, and the gear change end timing is determined based on whether a ratio of the input speed and the output speed matches with a reduction ratio after the speed is reduced by the transmission.

At Step S9, if it is under the gear change operation, the control unit shifts to Step S30 while maintaining the current lubricant supply pattern. That is, during the gear change operation, the control device returns without performing the switching operation of the lubricant supply pattern. Thus, since a change in the friction coefficient μ between the friction plates under the precise engagement control during the gear change can be suppressed, a gear change shock caused by the engagement timing deviating from the optimal timing due to the drag caused by the viscosity of lubricant can be suppressed when engaging the friction engagement elements.

For example, when performing the switching of the pattern in which the supply amount of lubricant increases during the gear change operation, a generation of the shock caused by engaging each friction engagement element at an earlier timing than the desired timing due to the viscosity of lubricant can be suppressed.

If it is not during the gear change operation at Step S9, the control unit shifts to Step S10, where the control device determines whether the lubricant supply pattern is Pattern 5. At Step S10, if the lubricant supply pattern is Pattern 5, the control unit prohibits the gear change operation even if the gear change command is detected, and it then shifts to Step S30 where the control is performed, and it then returns.

Thus, in the fifth lubricant supply pattern (Pattern 5), the gear change control by the gear change control logic 210 is suppressed, when the lubricant is supplied to each friction engagement element and the gear change command is outputted from the gear change control logic 210 based on the accelerator opening and the vehicle speed. Therefore, in the state of the vehicle where the thermal load of the second brake BR2 is more severe (e.g., the accelerator hill hold and towing), the durability of the second brake BR2 can be certainly secured by giving the priority to the lubrication of the second brake BR2 over the gear change operation.

At Step S10, if the lubricant supply pattern is other than Pattern 5, the control unit shifts to Step S11. At Step S11, the control unit determines whether it is during the switching of the lubricant supply pattern. The determination of whether it is during the switching of the lubricant supply pattern is made, for example, when the timer is started from the output timing of the lubricant supply pattern, and the timer is during a given time t2 where the switching of the supply amount of lubricant should be finished.

At Step S11, if it is during the switching of the lubricant supply pattern, the control unit prohibits the gear change operation even if the gear change command is detected, and then shifts to Step S30 where it performs the control and then returns.

Therefore, since the gear change operation during the lubricant supply pattern switching operation can be prohibited, the change in the friction coefficient μ between the friction plates during the precise engagement control under the gear change operation can be prevented. As a result, for example, a generation of the shock by each friction engagement element being engaged at the timing earlier than the desired timing because of the viscosity of lubricant when the switching operation of the pattern in which the supply amount of lubricant is increased is repeated during the gear change operation, can be suppressed.

If it is not during the switching of the lubricant supply pattern at Step S11, the control unit shifts to Step S12 where it permits the gear change. At the subsequent Step S13, the control unit determines whether the ATF temperature detected by the oil temperature sensor 205 is the given value Toil (e.g., 100° C.) or above. If the ATF temperature is the given value Toil or above at Step S13, the control unit determines the lubricant supply pattern as the second lubricant supply pattern and then shifts to Step S30 where it supplies the lubricant to the second brake BR2 and the first to third clutches CL1-CL3 in Pattern 2.

If the ATF temperature is the given value Toil or above, in this embodiment, since the transmission control module (TCM) disposed inside the oil pan may be heat-damaged by the high-temperature oil, it is necessary to lower the ATF temperature.

By switching it to the second lubricant supply pattern (Pattern 2), since the drag of the oil passage passing through the oil cooler 91 can be lowered as described above, the oil amount passing through the oil cooler 91 can be increased, and therefore, the ATF temperature can be lowered effectively.

At Step S13, if the ATF temperature is below the given value Toil, the control unit shifts to Step S14 where it determines the lubricant supply pattern by using a lubricant oil flow rate pattern determination flow illustrated in FIG. 11.

At Step S15, the control unit determines whether the temperature of the second brake BR2 is the first threshold Tlow (e.g., 150° C.) or above, and if the temperature of the second brake BR2 is below the first threshold Tlow, the control unit determines at Step S16 whether the input speed is the given value Nin (e.g., 3,000 rpm) or above, determines at Step S17 whether the input torque is the given value Tq1 (e.g., 250 Nm) or above, determines at Step S18 whether the temperature of the first clutch CL1 is the given value Tcl1 (e.g., 180° C.) or above, determines at Step S19 whether the temperature of the second clutch CL2 is the given value Tcl2 (e.g., 180° C.) or above, and determines at Step S20 whether the temperature of the third clutch CL3 is the given value Tcl3 (e.g., 180° C.) or above.

If the temperature of the second brake BR2 is below the first threshold Tlow, the input speed is below the given value Nin, the input torque is below the given value Tq1, the temperatures of the first to third clutches CL1, CL2, and CL3 are below the given values Tcl1, Tcl2, and Tcl3, the control unit determines that the lubricant supply pattern is the first lubricant supply pattern, and it then shifts to Step S30, where it supplies the lubricant to the second brake BR2 and the first to third clutches CL1, CL2, and CL3 in Pattern 1, and it then returns.

Moreover, if the temperature of the second brake BR2 is below the first threshold Tlow, any one of the input speed, the input torque, and the temperatures of the first to third clutches CL1, CL2, and CL3 is the given value(s) or above, the control unit determines that the lubricant supply pattern is the second lubricant supply pattern, it then shifts to Step S30, where it supplies the lubricant to the second brake BR2 and the first to third clutches CL1, CL2, and CL3 in Pattern 2, and it then returns.

On the other hand, if the temperature of the second brake BR2 is the first threshold Tlow or above at Step S15, the control unit determines at Step S21 whether the input speed is the given value Nin (e.g., 3,000 rpm) or above, determines at Step S22 whether the input torque is the given value Tq1 (e.g., 250 Nm) or above, determines at Step S23 whether the temperature of the first clutch CL1 is the given value Tcl1 (e.g., 180° C.) or above, determines at Step S24 whether the temperature of the second clutch CL2 is the given value Tcl2 (e.g., 180° C.) or above, and determines at Step S25 whether the temperature of the third clutch CL3 is the given value Tcl3 (e.g., 180° C.) or above.

If the temperature of the second brake BR2 is the first threshold Tlow or above, the input speed is below the given value Nin, the input torque is below the given value Tq1, the temperatures of the first to third clutches CL1, CL2, and CL3 are below the given values Tcl1, Tcl2, and Tcl3, the control unit determines that the lubricant supply pattern is the third lubricant supply pattern, it then shifts to Step S30, where it supplies the lubricant to the second brake BR2 and the first to third clutches CL1, CL2, and CL3 in Pattern 3, and it then returns.

Moreover, if the temperature of the second brake BR2 is the first threshold Tlow or above, any one of the input speed, the input torque, and the temperatures of the first to third clutches CL1, CL2, and CL3 is the given value(s) or above, the control unit determines that the lubricant supply pattern is the fourth lubricant supply pattern, it then shifts to Step S30, where it supplies the lubricant to the second brake BR2 and the first to third clutches CL1, CL2, and CL3 in Pattern 4, and it then returns.

According to the above configuration, since the lubricant supply pattern can be switched according to the temperature of the second brake BR2, the input torque, the input speed, and the temperatures of the first to third clutches CL1, CL2, and CL3, the suitable amount of lubricant can be supplied to the second brake BR2 and the first to third clutches CL1, CL2, and CL3 according to the state of the vehicle.

Therefore, while the priority is normally given to fuel efficiency, and the amounts of lubricant to the second brake BR2 and the first to third clutches CL1, CL2, and CL3 are reduced, the necessary amount of lubricant can be supplied to each of the second brake BR2 and the first to third clutches CL1, CL2, and CL3. As a result, in consideration of the state of the vehicle, both the improvement in fuel efficiency and the assurance of the durability of each friction engagement element can be achieved, as the whole transmission.

Particularly, as for the switching of the amount of lubricant to the second brake BR2 which is sensitive to the generation of heat, the supply amount of lubricant can be set appropriately by using the temperature of the second brake BR2 which is the parameter more direct to the thermal load.

The amounts of lubricant supplied to the second brake BR2 and the first to third clutches CL1, CL2, and CL3 are made into the five patterns including the first to fifth lubricant supply patterns. Thus, it is not required to control the amounts of lubricant to the second brake BR2 and the first to third clutches CL1, CL2, and CL3 independently, but only determining the lubricant supply patterns based on the parameters makes it possible to supply the suitable flow rates of lubricant to these elements as needed.

Therefore, without complicating the control contents and the control conditions, both the improvement in fuel efficiency and the assurance of the reliability of each friction engagement element can be achieved by supplying the amount of lubricant necessary for each friction engagement element of the automatic transmission according to the state of the vehicle.

The present disclosure is not limited to the illustrated embodiment, and various improvements and design alterations are possible without departing from the spirit of the present disclosure.

Although in the above embodiment the lubricant supplied to the first brake BR1 is supplied from the lubricant passage L12 provided to the input shaft 12, the lubricant supplied to the first brake BR1 may be supplied from the supply route same as the lubricant to the first to third clutches CL1-CL3, for example. In this case, as for the determination of the supply amounts of lubricant to the first to third clutches CL1-CL3 and the first brake BR1, a step for determining whether the temperature of the first brake BR1 is a given value (e.g., 180° C.) or above may be added after Steps S20 and S25 of the flowchart in FIG. 11.

Moreover, for example, although in this embodiment the lubricant supply pattern is determined based on whether the temperature of the second brake BR2, the input speed, the input torque, and the temperatures of the first to third clutches CL1-CL3 are the given thresholds or above, the lubricant supply pattern may be determined based on the temperatures of the first to third clutches CL1-CL3 and the temperature of the second brake BR2. Thus, by using as the parameter the temperatures of the second brake BR2 and the first to third clutches CL1-CL3, the supply amount of lubricant can be set appropriately.

Moreover, for example, although in this embodiment the temperature of each friction engagement element is obtained by the calculation, the temperature of each friction engagement element may be detected using a temperature sensor 208 of each friction engagement element, as illustrated by imaginary lines in FIG. 7.

Moreover, for example, as for the determination of whether it is under the gear change operation at Step S9, the end timing of the gear change may be determined based on whether each friction engagement element is fully engaged.

Moreover, for example, although in this embodiment the switching operation of the lubricant supply pattern is limited during the gear change operation, and the gear change operation is prohibited during the switching operation of the lubricant supply pattern, only one of the limitation of the switching operation of the lubricant supply pattern under the gear change operation, and the prohibition of the gear change operation under the switching operation of the lubricant supply pattern may be performed.

Moreover, for example, although in this embodiment the increasing circuit for each friction engagement element (the increasing orifice and the increasing valve) is provided in order to increase the supply amount of lubricant to each friction engagement element, variable orifices may be used and the diameters of the orifices may be adjusted according to the operating state of the vehicle, instead of the increasing orifices 84 and 85, the lubricant increasing valves 34 and 35, and the fixed orifices 81, 82, and 83.

As described above, according to the present disclosure, by the control device for the automatic transmission controlling the supply of the lubricant as needed according to the traveling state of the vehicle, since both the improvement in fuel efficiency and the assurance of the durability of the vehicle-propelling friction engagement elements and other friction engagement elements of the transmission can be achieved, the present disclosure may be suitably used in the manufacturing field of transmissions.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Automatic Transmission
200 Control Unit
203 Input Speed Sensor (Input Speed Detector)
206 Input Torque Sensor (Input Torque Detector)
220 Lubricant Supply Control Logic
230 Friction Engagement Element Temperature Calculation logic (Vehicle-propelling Friction Engagement Element Temperature Detector, Other Friction Engagement Element Temperature Detector)
BR2 Second Brake (Vehicle-propelling Friction Engagement Element)
CL1, CL2, CL3 First, Second, and Third Clutches (Other Friction Engagement Element)

What is claimed is:

1. A control device for an automatic transmission, comprising:
a brake configured to be engaged when a vehicle starts traveling;
a clutch;
an oil temperature sensor that detects a temperature of oil stored in the automatic transmission; and
a processor configured to execute lubricant supply control logic to control supply of lubricant to the brake and the clutch and calculate a temperature of the brake and a temperature of the clutch based at least on the sensed oil temperature, wherein the lubricant supply control logic switches a supply amount of lubricant to the brake according to the temperature of the brake, and switches a supply amount of lubricant to the clutch according to the temperature of the clutch, wherein the lubricant supply control logic is provided with lubricant supply patterns for switching a supply destination of lubricant and a supply amount of lubricant to the supply destination, and wherein the lubricant supply patterns include:
- a first lubricant supply pattern in which the supply amount of lubricant to the brake is set as a given first flow rate, and the supply amount of lubricant to the clutch is set as a given second flow rate,
- a second lubricant supply pattern in which the supply amount of lubricant to the brake is set as the given first flow rate, and the supply amount of lubricant to the clutch is set as a given third flow rate greater than the given second flow rate;
- a third lubricant supply pattern in which the supply amount of lubricant to the brake is set as a given fourth flow rate greater than the given first flow rate, and the supply amount of lubricant to the clutch is set as the given second flow rate; and
- a fourth lubricant supply pattern in which the supply amount of lubricant to the brake is set as the given fourth flow rate, and the supply amount of lubricant to the clutch is set as the given third flow rate.

2. The control device of claim 1, wherein the lubricant supply control logic switches the lubricant supply pattern to the second lubricant supply pattern, when the temperature of the brake is below a threshold and the temperature of the clutch is a threshold or above.

3. The control device of claim 1, wherein the lubricant supply control logic switches the lubricant supply pattern to the fourth lubricant supply pattern, when the temperature of the brake is a threshold or above and the temperature of the clutch is a threshold or above.

4. The control device of claim 2, wherein the lubricant supply control logic switches the lubricant supply pattern to the fourth lubricant supply pattern, when the temperature of the brake is the threshold or above and the temperature of the clutch is the threshold or above.

5. The control device of claim 1, wherein the lubricant supply control logic is further provided with a fifth lubricant supply pattern in which the supply amount of lubricant to the brake is set as a given fifth flow rate greater than the given fourth flow rate, and the supply amount of lubricant to the clutch is set as the given second flow rate.

6. The control device of claim 2, wherein the lubricant supply control logic is further provided with a fifth lubricant supply pattern in which the supply amount of lubricant to the brake is set as a given fifth flow rate greater than the given fourth flow rate, and the supply amount of lubricant to the clutch is set as the given second flow rate.

7. The control device of claim 3, wherein the lubricant supply control logic is further provided with a fifth lubricant supply pattern in which the supply amount of lubricant to the brake is set as a given fifth flow rate greater than the given fourth flow rate, and the supply amount of lubricant to the clutch is set as the given second flow rate.

* * * * *